US012062950B2

(12) United States Patent
Markert et al.

(10) Patent No.: US 12,062,950 B2
(45) Date of Patent: Aug. 13, 2024

(54) GEAR MOTOR

(71) Applicant: SUMITOMO HEAVY INDUSTRIES, LTD., Tokyo (JP)

(72) Inventors: Sebastian Markert, Markt Indersdorf (DE); Andreas Mueller, Markt Indersdorf (DE)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/352,074

(22) Filed: Jul. 13, 2023

(65) Prior Publication Data

US 2023/0361656 A1 Nov. 9, 2023

Related U.S. Application Data

(63) Continuation of application No. 17/591,819, filed on Feb. 3, 2022, now Pat. No. 11,742,725.

(30) Foreign Application Priority Data

Mar. 16, 2021 (JP) ................. 2021-041994

(51) Int. Cl.
*H02K 11/215* (2016.01)
*F16C 19/54* (2006.01)
(Continued)

(52) U.S. Cl.
CPC ............ *H02K 11/215* (2016.01); *F16C 19/54* (2013.01); *F16H 57/02* (2013.01); *F16H 59/14* (2013.01);
(Continued)

(58) Field of Classification Search
CPC .... H02K 11/215; H02K 5/1732; H02K 7/083; H02K 7/102; H02K 7/116; H02K 11/33;
(Continued)

(56) References Cited

U.S. PATENT DOCUMENTS 9,293,962 B2 3/2016 Park et al.
10,300,609 B2 5/2019 Jackowski et al.
(Continued)

FOREIGN PATENT DOCUMENTS

CN  113394913 A  9/2021
JP  2001-218421 A  8/2001
(Continued)

OTHER PUBLICATIONS

Translation of WO 2013069774 A1, Yamamoto et al., May 16, 2013. (Year: 2013).*

(Continued)

*Primary Examiner* — Vinh Luong
(74) *Attorney, Agent, or Firm* — Michael Best & Friedrich LLP

(57) ABSTRACT

Provided is a gear motor including a motor, a speed reducer, a first detector disposition section in which a first rotation detector that detects rotation of a rotor shaft is disposed, a second detector disposition section in which a second rotation detector that detects rotation of an output member of the speed reducer is disposed, and a third detector disposition section in which a torque detector is disposed, in which the gear motor is operable when the first rotation detector is disposed in the first detector disposition section, the second (Continued)

rotation detector is disposed in the second detector disposition section, and the torque detector is disposed in the third detector disposition section, and is operable even when a portion thereof is disposed.

15 Claims, 13 Drawing Sheets

(51) Int. Cl.
| | |
|---|---|
| *F16H 57/02* | (2012.01) |
| *F16H 59/14* | (2006.01) |
| *F16H 63/34* | (2006.01) |
| *H02K 5/173* | (2006.01) |
| *H02K 7/08* | (2006.01) |
| *H02K 7/102* | (2006.01) |
| *H02K 7/116* | (2006.01) |
| *H02K 11/33* | (2016.01) |

(52) U.S. Cl.
CPC ......... *F16H 63/345* (2013.01); *H02K 5/1732* (2013.01); *H02K 7/083* (2013.01); *H02K 7/102* (2013.01); *H02K 7/116* (2013.01); *H02K 11/33* (2016.01); *F16H 2057/02034* (2013.01)

(58) Field of Classification Search
CPC .... H02K 5/225; H02K 2213/03; H02K 11/24; H02K 7/14; H02K 5/10; H02K 11/21; F16C 19/54; F16C 25/083; F16C 2380/27; F16H 57/02; F16H 59/14; F16H 63/345; F16H 2057/02034; B25J 9/126; B25J 13/088; Y10S 901/02; Y10S 901/23
See application file for complete search history.

(56) References Cited

U.S. PATENT DOCUMENTS

| | | | |
|---|---|---|---|
| 10,525,601 | B2 | 1/2020 | Jackowski et al. |
| 10,557,707 | B2 | 2/2020 | Omata et al. |
| 11,821,510 | B1 * | 11/2023 | Schmidtberger ........ F16H 59/16 |
| 2013/0257230 | A1 | 10/2013 | Park et al. |
| 2016/0072366 | A1 | 3/2016 | Omata et al. |
| 2018/0169868 | A1 | 6/2018 | Jackowski et al. |
| 2019/0160654 | A1 | 5/2019 | Moritani et al. |
| 2019/0248021 | A1 | 8/2019 | Jackowski et al. |
| 2020/0003256 | A1 * | 1/2020 | Koroyasu ............. F16C 19/546 |
| 2020/0336044 | A1 | 10/2020 | Kume et al. |
| 2021/0404525 | A1 * | 12/2021 | Fukasawa ............. F16D 65/123 |
| 2022/0316560 | A1 | 10/2022 | Shiokawa |

FOREIGN PATENT DOCUMENTS

| | | | | |
|---|---|---|---|---|
| JP | | 2013-215081 A | 10/2013 | |
| JP | | 2020-502964 A | 1/2020 | |
| WO | | 2012050130 A1 | 4/2012 | |
| WO | WO | 2013069774 A1 * | 5/2013 | ............... B60K 1/00 |
| WO | | 2019188844 A1 | 10/2019 | |
| WO | | 2021209723 A1 | 10/2021 | |

OTHER PUBLICATIONS

Japanese Office Action mailed on May 28, 2024 for the corresponding Japanese Patent Application No. 2021-041994, with English machine translation.

* cited by examiner

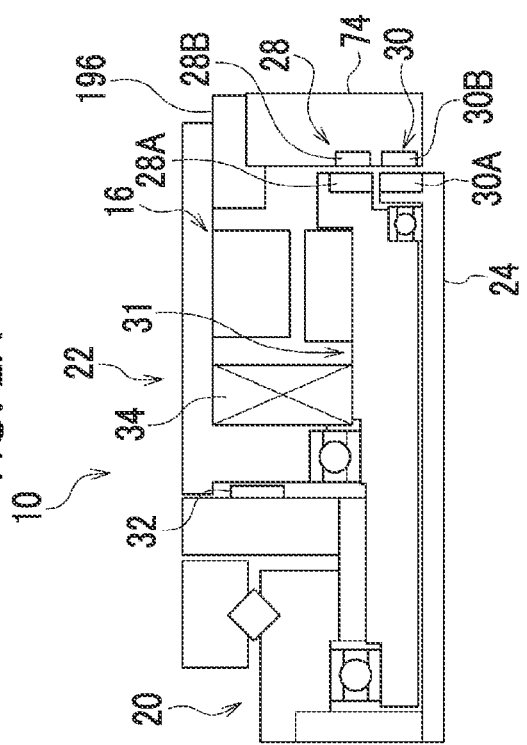
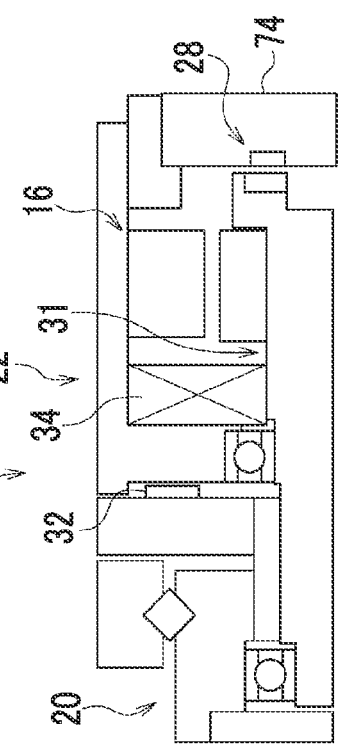
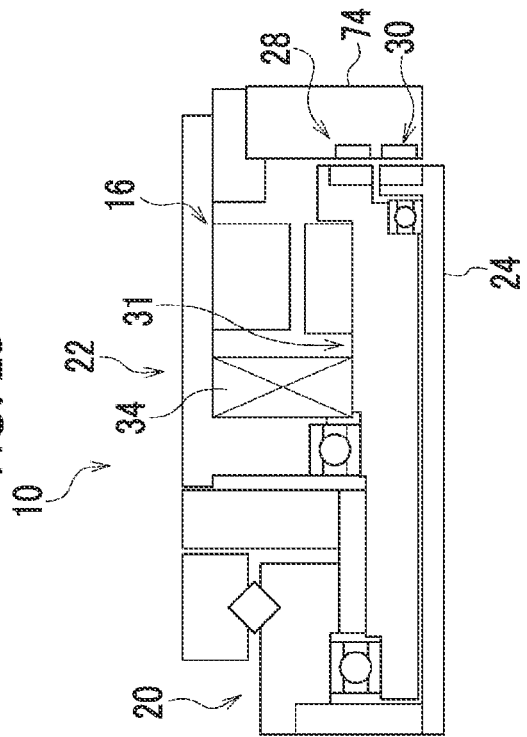
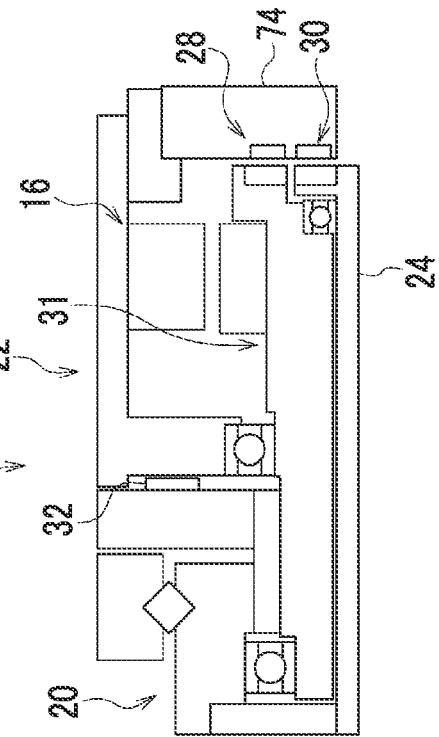

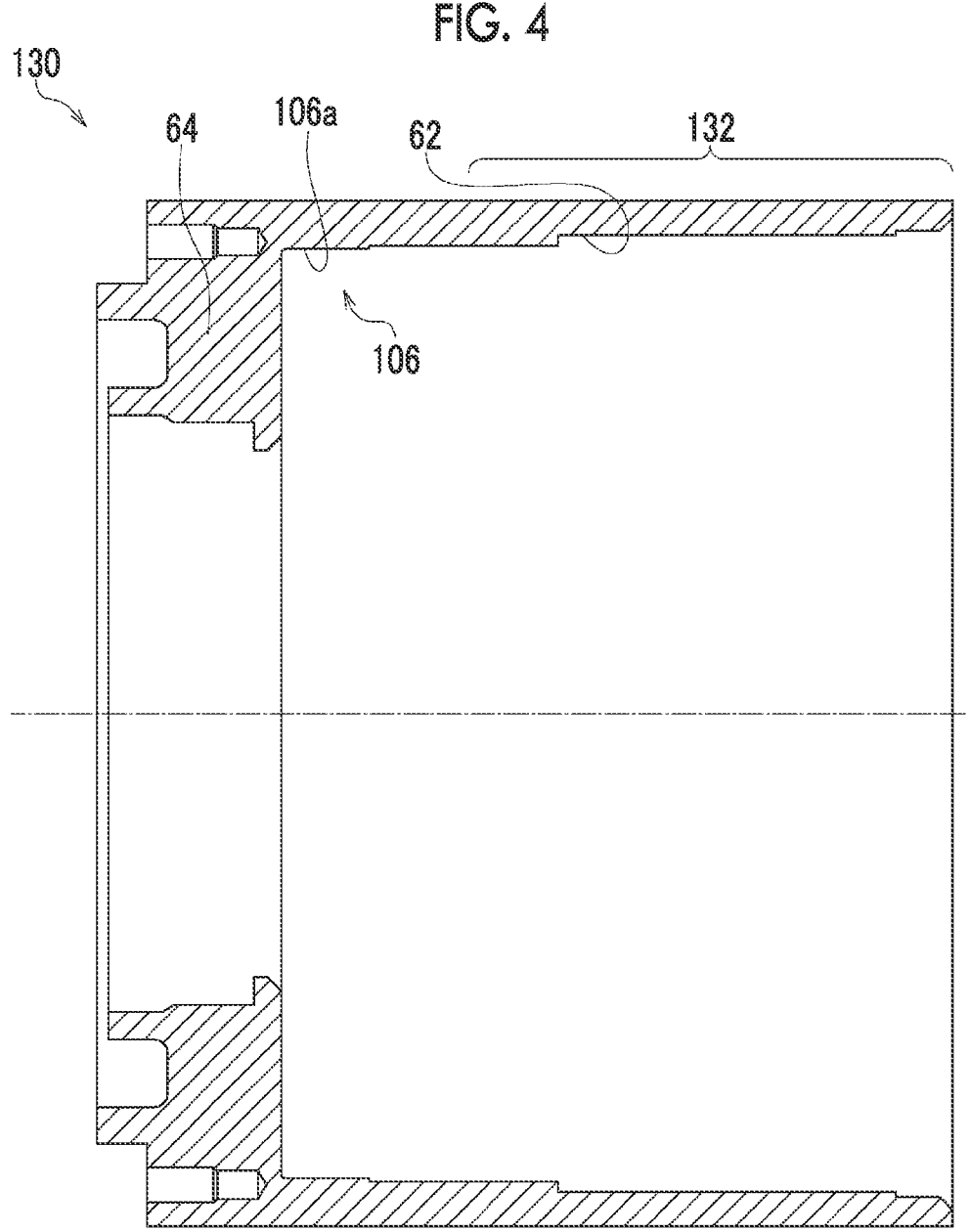

GEAR MOTOR

RELATED APPLICATIONS

This application is a continuation of U.S. patent application Ser. No. 17/591,819, filed on Feb. 3, 2022. Further, this application is based upon and claims the benefit of priority from Japanese Patent Application No. 2021-041994, filed on Mar. 16, 2021, the entire contents of these applications are incorporated herein by reference.

BACKGROUND

Technical Field

Certain embodiments of the present invention relate to a gear motor.

Description of Related Art

The related art discloses a gear motor including a rotor shaft, an output shaft, a first rotation detector that detects rotation of the rotor shaft, and a second rotation detector that detects rotation of the output shaft.

SUMMARY

According to an embodiment of the present disclosure, there is provided a gear motor including a motor and a speed reducer. The gear motor includes a first detector disposition section in which a first rotation detector that detects rotation of a rotor shaft is disposed, a second detector disposition section in which a second rotation detector that detects rotation of an output member of the speed reducer is disposed, and a third detector disposition section in which a torque detector is disposed. The gear motor is operable when the first rotation detector is disposed in the first detector disposition section, the second rotation detector is disposed in the second detector disposition section, and the torque detector is disposed in the third detector disposition section, and is operable even when a portion thereof is disposed.

BRIEF DESCRIPTION OF THE DRAWINGS

FIG. 2A is a schematic view of the gear motor according to the one embodiment. FIG. 2B is a schematic view of a gear motor according to one modification form.

FIG. 2C is a schematic view of a gear motor according to another modification form. FIG. 2D is a schematic view of a gear motor according to still another modification form.

FIG. 4 is a side sectional view illustrating a base housing according to the one embodiment.

DETAILED DESCRIPTION

Figure 1:
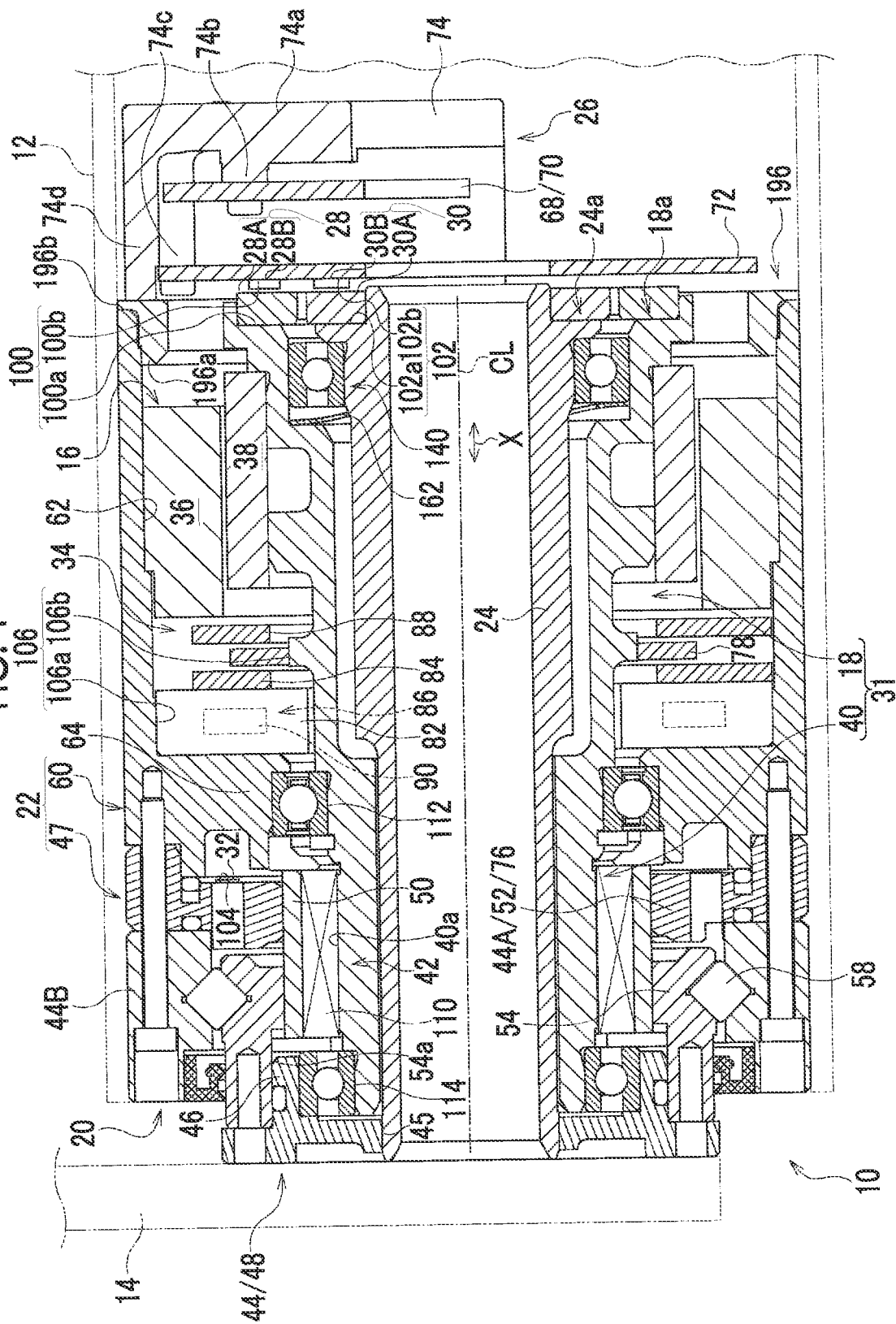
FIG. 1 is a side sectional view of a gear motor according to one embodiment.

A detector that needs to be incorporated in a gear motor varies depending on a customer. When a dedicated gear motor is designed for each combination of detectors required by the customer, a plurality of types of the gear motors need to be individually prepared in response to the number of combinations of required detectors. This need leads to an increase in manufacturing costs, and thus, it is desirable to suggest an improvement.

It is desirable to provide a technique capable of reducing manufacturing costs in handling a plurality of types of gear motors.

According to the present disclosure, it is possible to reduce manufacturing costs in handling the plurality of types of gear motors.

Hereinafter, embodiments will be described. The same reference numerals will be assigned to the same components, and repeated description will be omitted. In each drawing, the components are appropriately omitted, enlarged, or reduced for convenience of description. The drawings need to be viewed in accordance with a direction of the reference numerals.

One Embodiment

With reference to FIG. 1, an embodiment will be described. A gear motor 10 connects a first mating member 12 and a second mating member 14 to each other. The gear motor 10 can rotate the second mating member 14 relative to the first mating member 12. The gear motor 10 according to the present embodiment is incorporated in a joint portion of an industrial robot. The first and second mating members 12 and 14 according to the present embodiment are formed by either a base member or an arm member of an articulated arm.

The gear motor 10 mainly includes a motor 16, a rotor shaft 18 rotated by the motor 16, a speed reducer 20 that reduces a rotation speed of the rotor shaft 18, a reduction mechanism 42 of the speed reducer 20, and a housing 22 that accommodates the motor 16. The gear motor 10 according to the present embodiment includes a detection shaft 24 penetrating an input shaft 40 and the rotor shaft 18 of the speed reducer 20, and a driver unit 26 disposed on a counter load side from the motor 16. The gear motor 10 according to the present embodiment further includes a first rotation detector 28 that detects rotation of the rotor shaft 18, a second rotation detector 30 that detects rotation of an output member 48 of the speed reducer 20, and a torque detector 32 that detects a torque of a shaft body 31 including the rotor shaft 18 and the input shaft 40. The gear motor 10 according to the present embodiment includes a brake 34 that brakes the shaft body 31. The first mating member 12 is integrated with the housing 22 by using a screw, and the second mating member 14 is integrated with a carrier 44 of the speed reducer 20 by using a screw.

Hereinafter, a direction extending along a rotation center line CL of the rotor shaft 18 will be referred to as an axial direction X, and a circumference direction and a radius direction of a circle formed around the rotation center line CL will respectively be referred to as a "circumferential direction" and a "radial direction". In addition, a side facing the speed reducer 20 from the motor 16 in the axial direction X (left side in FIG. 1) will be referred to as a "load side", and a side opposite thereto in the axial direction X (right side in FIG. 1) will be referred to as a "counter load side".

The motor 16 includes a stator 36 fixed to a motor housing 60 of the housing 22, and a rotor 38 rotated integrally with the rotor shaft 18. The rotor shaft 18 penetrates the motor 16 in the axial direction X.

The speed reducer 20 includes the input shaft 40 to which the rotation of the rotor shaft 18 is input, and the reduction mechanism 42 for reducing the rotation speed of the input shaft 40. In addition, the speed reducer 20 includes the carrier 44 disposed on the load side in the axial direction with respect to the reduction mechanism 42, a speed reducer housing 47 accommodating the reduction mechanism 42, and the output member 48 that extracts the speed-reduced rotation from the reduction mechanism 42.

The reduction mechanism 42 according to the present embodiment is a bending meshing type gear mechanism that axially rotates an internal gear by causing the input shaft 40 to bend and deform an external gear 50, and that causes the output member 48 to extract an axial rotation component thereof. The reduction mechanism 42 according to the present embodiment is a tubular bending meshing type gear mechanism using a first internal gear 52 whose relative rotation with respect to the speed reducer housing 47 is restrained, and a second internal gear 54 whose relative rotation with respect to the speed reducer housing 47 is allowed.

The input shaft 40 includes a gear drive unit 40a that drives a gear (external gear 50) of the reduction mechanism 42. The gear drive unit 40a of the input shaft 40 used for the bending meshing type gear mechanism has an elliptical shape in a cross section perpendicular to the axial direction X. Here, the elliptical shape includes not only a geometrically exact elliptical shape but also a substantially elliptical shape.

The reduction mechanism 42 includes an external gear 50 disposed on an outer peripheral side of the input shaft 40, and first and second internal gears 52 and 54 that mesh with the external gear 50. The external gear 50 is supported to be rotatable by the input shaft 40 via a first external bearing 110 disposed between the gear drive unit 40a of the input shaft 40 and the external gear 50. The external gear 50 according to the present embodiment has flexibility, and when the input shaft 40 rotates, the external gear 50 is bent and deformed to form an elliptical shape that aligns with the gear drive unit 40a of the input shaft 40.

The first internal gear 52 is disposed on the counter load side. The second internal gear 54 is disposed on the load side. The first internal gear 52 has a number of internal teeth (for example, 102) different from the number of external teeth (for example, 100) of the external gear 50, and the second internal gear 54 has a number of internal teeth which is the same as the number of external teeth of the external gear 50. In the reduction mechanism 42 according to the present embodiment, each time the input shaft 40 rotates once, the external gear 50 axially rotates together with the second internal gear 54 by the amount corresponding to a difference in the number of teeth between the external gear 50 and the first internal gear 52.

The carrier 44 forms an annular shape as a whole. The carrier 44 includes a through-hole 45 penetrating a central portion of the carrier 44, and a fitting protrusion 46 protruding to the load side. The carrier 44 is integrated with the second internal gear 54 by the fitting protrusion 46 spigot-fitted into a fitting recessed portion 54a provided in the second internal gear 54.

The speed reducer housing 47 according to the present embodiment includes a first housing member 44A that also serves as the first internal gear 52, and a second housing member 44B disposed outside the second internal gear 54 in the radial direction. The first housing member 44A and the second housing member 44B are integrated with each other by a screw. A main bearing 58 is disposed between the speed reducer housing 47 and the second internal gear 54.

The output member 48 according to the present embodiment is the carrier 44, and outputs the rotation extracted from the reduction mechanism 42 to the second mating member 14.

The housing 22 includes the above-described speed reducer housing 47 that accommodates the reduction mechanism 42, and the motor housing 60 that accommodates the motor 16. The speed reducer housing 47 is integrated with the motor housing 60 by using a bolt.

The motor housing 60 has a tubular shape as a whole. The motor housing 60 according to the present embodiment is an integrally molded product obtained by integral molding, and is formed of a single member. The motor housing 60 according to the present embodiment is a die-cast product formed of aluminum (metal), as the integrally molded product. Alternatively, the motor housing 60 may be a machined metal product.

The motor housing 60 includes a stator disposition section 62 in which the stator 36 is disposed, and an inner flange portion 64 provided on the counter load side from the stator disposition section 62. The stator 36 is fixed to the stator disposition section 62 by using an adhesive or fitting. The inner flange portion 64 protrudes inward in the radial direction in an inner peripheral portion of the motor housing 60. The motor housing 60 additionally includes a portion (housing-side portion 106a to be described later) of a brake disposition section 106 in which the brake 34 is disposed. The housing-side portion 106a is provided between the stator disposition section 62 and the inner flange portion 64.

In addition to the shaft body 31, the detection shaft 24 penetrates the through-hole 45 of the output member 48 (carrier 44) in the axial direction X. The detection shaft 24 is fixed to the output member 48, and is provided to be rotatable integrally with the output member 48. Specifically, a load-side end portion of the detection shaft 24 is fixed to the output member 48 by being tightened and fitted into the through-hole 45 of the output member 48. In this manner, the detection shaft 24 can be fixed to the output member 48 while a position in the axial direction with respect to the output member 48 is adjusted.

The driver unit 26 includes a control board 70 that forms a control unit 68 in which a driver circuit is incorporated, a sensor board 72 on which sensors 28B and 30B (to be described later) of the rotation detectors 28 and 30 are mounted, and a board holder 74 for holding the boards 70 and 72. The sensor board 72 is electrically connected to the control unit 68 of the control board 70 via a wiring (not illustrated). The control unit 68 can drive the motor 16 to rotate the rotor shaft 18.

The first and second rotation detectors 28 and 30 according to the present embodiment are rotary encoders. The first rotation detector 28 includes a first detection target member 28A that can rotate integrally with the rotor shaft 18, and the first sensor 28B that can detect the first detection target member 28A. The second rotation detector 30 includes a second detection target member 30A that can rotate integrally with the output member 48, and the second sensor 30B that can detect the second detection target member 30A. When the rotation detectors 28 and 30 are the rotary encoders, the detection target members 28A and 30A are encoder discs, and the sensors 28B and 30B are optical sensors or magnetic sensors, for example. The rotation detectors 28 and 30 can detect the rotation of a relevant object (the rotor shaft 18 and the output member 48) by causing the sensors 28B and 30B to detect the detection target members 28A and 30A. A combination of the detection target members 28A and 30A and the sensors 28B and 30B which form the rotation detectors 28 and 30 is not limited thereto. The rotation detectors 28 and 30 are not limited to the rotary encoders, and various rotation detectors can be adopted. For example, a resolver or a Hall element may be used.

The first detection target member 28A is disposed in a counter load-side end portion 18*a* of the rotor shaft 18. The second detection target member 30A is disposed in a counter load-side end portion 24*a* of the detection shaft 24 rotating integrally with the output member 48. The first and second sensors 28B and 30B are disposed at positions facing the first and second detection target members 28A and 30A in the axial direction X. In the present embodiment, the first and second sensors 28B and 30B are mounted on the sensor board 72 of the driver unit 26. The counter load-side end surfaces of the first and second detection target members 28A and 30A are provided at positions aligned in the axial direction X. The load-side end surfaces of the first and second sensors 28B and 30B are provided at positions aligned in the axial direction X with respect to the sensor board 72.

The torque detector 32 according to the present embodiment is a strain sensor such as a strain gauge mounted on a strain member 76 which generates strain in response to a torque of the shaft body 31. The torque detector 32 is not limited to the strain gauge as long as the torque can be detected. The strain member 76 according to the present embodiment is the first internal gear 52 to which the torque of the shaft body 31 is transmitted from the shaft body 31 via the external gear 50. The torque detector 32 is mounted on a side portion on the counter load side in the axial direction X in the first internal gear 52. In the present embodiment, although not illustrated, a plurality of the torque detectors 32 are mounted at an interval in the circumferential direction in the first internal gear 52.

The torque detector 32 detects strain of the strain member 76, thereby acquiring a detection signal indicating the amount of the strain. The torque detector 32 outputs the acquired detection signal to a signal processing unit (not illustrated). The signal processing unit detects the torque of the strain member 76 by processing the detection signal output from the torque detector 32. For example, the signal processing unit may detect the torque of the shaft body 31 by referring to a data table in which the amount of the strain of the strain member 76 and the torque of the shaft body 31 are uniquely associated with each other. A controlling manner based on the detected torque is not particularly limited. For example, based on the detected torque, the signal processing unit may detect contact of an obstacle (for example, a person) with the second mating member 14, and may perform the control to stop the motor 16.

Alternatively, the control can be performed so that the second mating member 14 is pressed against an external member with a predetermined pressing force. The signal processing unit may be incorporated in either the torque detector 32 or the control unit 68 of the driver unit 26.

The brake 34 is provided on the load side with respect to the motor 16. The brake 34 is provided between the motor 16 and the speed reducer 20. The brake 34 includes a brake mechanism 80 that brakes a rotating member 78, and a brake body 82 on which the brake mechanism 80 is mounted. The brake body 82 has a role of supporting the brake mechanism 80, and is fixed to the housing 22. The rotating member 78 according to the present embodiment is separated from the shaft body 31, and is mounted on the shaft body 31 as a portion of the brake 34. Alternatively, the rotating member 78 may be the shaft body 31 itself, and in this case, the rotating member 78 is provided separately from the brake 34. The brake 34 according to the present embodiment is a disc brake, and the rotating member 78 is a disc-shaped brake rotor.

The brake mechanism 80 includes a movable friction member 84 that brakes the rotating member 78 via friction, and a pressing mechanism 86 that presses the friction member 84 toward the rotating member 78. The brake mechanism 80 according to the present embodiment includes a fixed friction member 88 provided on a side opposite to the movable friction member 84 in the axial direction with respect to the rotating member 78. The movable friction member 84 is supported by a guide pin (not illustrated) so that the movable friction member 84 can be guided in the axial direction X. The fixed friction member 88 is fixed to the brake body 82 via a guide pin (not illustrated).

The pressing mechanism 86 is an electric type that drives the movable friction member 84 by using electric power. Specifically, the pressing mechanism 86 includes a biasing member (not illustrated) such as a spring that biases the movable friction member 84, and a coil 90 for driving the movable friction member 84 to a side in the axial direction opposite to a biasing direction of the biasing member. The movable friction member 84 is an armature, and is driven by an attractive force generated by a magnetic force of the coil 90.

When energization for the coil 90 is released, the brake mechanism 80 causes the biasing member to press the movable friction member 84 against the rotating member 78, thereby braking the rotating member 78 by using the friction of the movable friction member 84. In this case, the brake mechanism 80 according to the present embodiment brakes the rotating member 78 by pinching the rotating member 78 between the movable friction member 84 and the fixed friction member 88. When the energization for the coil 90 is performed, the brake mechanism 80 causes the coil 90 to drive the movable friction member 84 to be separated from the rotating member 78, thereby causing the movable friction member 84 to release the braking of the rotating member 78.

The gear motor 10 includes a first detector disposition section 100 in which the first rotation detector 28 is disposed, a second detector disposition section 102 in which the second rotation detector 30 is disposed, a third detector disposition section 104 in which the torque detector 32 is disposed, and a brake disposition section 106 in which the brake 34 is disposed.

The first detector disposition section 100 according to the present embodiment includes a first shaft-side portion 100a provided in the counter load-side end portion 18a of the rotor shaft 18, and a first facing portion 100b provided at a position facing the first shaft-side portion 100a. The first facing portion 100b according to the present embodiment is provided in the sensor board 72 at the position facing the first shaft-side portion 100a in the axial direction. The first detection target member 28A of the first rotation detector 28 is disposed in the first shaft-side portion 100a, and the first sensor 28B of the first rotation detector 28 is disposed in the first facing portion 100b.

The second detector disposition section 102 according to the present embodiment includes a second shaft-side portion 102a provided in the counter load-side end portion 24a of the detection shaft 24, and a second facing portion 102b provided at a position facing the second shaft-side portion 102a. The second facing portion 102b according to the present embodiment is provided in the sensor board 72 at the position facing the second shaft-side portion 102a in the axial direction X. The second detection target member 30A of the second rotation detector 30 is disposed in the second shaft-side portion 102a, and the second sensor 30B of the second rotation detector 30 is disposed in the second facing portion 102b.

The third detector disposition section 104 according to the present embodiment is provided on the above-described first internal gear 52. Specifically, the third detector disposition section 104 is provided in a side portion in the axial direction X on the counter load side of the first internal gear 52.

The brake disposition section 106 according to the present embodiment includes a housing-side portion 106a provided in an inner peripheral portion of the housing 22, and a third shaft-side portion 106b provided in an outer peripheral portion of the rotor shaft 18. The third shaft-side portion 106b is provided integrally with the rotor shaft 18. The third shaft-side portion 106b is provided as a portion of the single rotor shaft 18. The brake body 82 serving as a portion of the brake 34 is disposed in the housing-side portion 106a, and the rotating member 78 serving as a portion of the brake 34 is disposed in the third shaft-side portion 106b. The brake body 82 is fixed to the housing-side portion 106a by press fitting to the housing-side portion 106a.

The rotating member 78 is fixed to the third shaft-side portion 106b to be movable in the axial direction X by fitting using a spline (integrated in a rotation direction of the third shaft-side portion 106b). A male spline is provided in the third shaft-side portion 106b, and a female spline is provided in the inner peripheral portion of the rotating member 78. Means for fixing the rotating member 78 to the third shaft-side portion 106b is not particularly limited, and, for example, press fitting without using the spline may be used.

The gear motor 10 is operable when the first rotation detector 28 is disposed in the first detector disposition section 100, the second rotation detector 30 is disposed in the second detector disposition section 102, and the torque detector 32 is disposed in the third detector disposition section 104, and is operable even when a portion thereof is disposed. The description of "when a portion thereof is disposed" means that when at least one of the first and second rotation detectors 28 and 30 and the torque detector 32 is disposed in the corresponding disposition sections 100, 102, and 104, and the rest thereof is not disposed. Here, the description of "when not disposed" means when the gear motor 10 does not include an object which is not disposed among the first and second rotation detectors 28 and 30 and the torque detector 32. For example, as in the following case, the gear motor 10 does not include the first and second rotation detectors 28 and 30, and the torque detector 32 is disposed in the third detector disposition section 104. Furthermore, the gear motor 10 may be operable, even when all of the first rotation detector 28, the second rotation detector 30, and the torque detector 32 are not disposed. In this case, the gear motor 10 is driven by so-called sensorless control.

A first condition for disposing the first rotation detector 28 in the first detector disposition section 100, a second condition for disposing the second rotation detector 30 in the second detector disposition section 102, and a third condition for disposing the torque detector 32 in the third detector disposition section 104 are assumed. In this case, it is conceivable that the gear motor 10 is operable, even when all of the first to third conditions are satisfied and even when only some of the conditions are satisfied (when some of the conditions are not satisfied).

In addition, the gear motor 10 is operable, even when the brake 34 is disposed in the brake disposition section 106 and even when the brake 34 is not disposed. "When the brake 34 is not disposed" means when the gear motor 10 does not include the brake 34.

With reference to FIG. 1 and FIGS. 2A to 2D, description will be continued. FIGS. 2A to 2D are schematic views of the gear motor 10 according to the one embodiment, one modification form, another modification form, and still another modification form. FIG. 2B is the gear motor 10 in which the torque detector 32 is omitted from the gear motor 10 in FIG. 2A. FIG. 2C is the gear motor 10 in which the second rotation detector 30 and the detection shaft 24 are omitted from the gear motor 10 in FIG. 2A. FIG. 2D is the gear motor 10 in which the brake 34 is omitted from the gear motor 10 in FIG. 2A. Any one of the gear motors 10 in FIGS. 2B to 2D have the same configuration as that of the gear motor 10 in FIG. 2A except for the omitted object.

FIG. 2A illustrates a case where the detectors 28, 30, and 32 and the brake 34 are disposed in the corresponding disposition sections 100, 102, 104, and 106. FIG. 2B illustrates a case where the first and second rotation detectors 28 and 30 and the brake 34 are disposed in the corresponding disposition sections 100, 102, and 106, and the torque detector 32 is not disposed. FIG. 2C illustrates a case where the first rotation detector 28, the torque detector 32, and the brake 34 are disposed in the corresponding disposition sections 100, 104, and 106, and the second rotation detector 30 is not disposed. FIG. 2D illustrates a case where the detectors 28, 30, and 32 are disposed in the corresponding disposition sections 100, 102, and 104, and the brake 34 is not disposed. The above-described contents mean that the gear motor 10 is operable in any one of the cases.

In order to satisfy the condition of "when not disposed" here, a member itself including the disposition sections 100, 102, 104, and 106 to which the relevant object is to be disposed may be omitted. For example, in order to satisfy the condition of "when the second rotation detector 30 is not disposed", the detection shaft 24 including the second shaft-side portion 102a of the second detector disposition section 102 may be omitted (refer to FIG. 2C). In this case, the sensor board 72 including the second facing portion 102b of the second detector disposition section 102 may be omitted, or may not be omitted. The same applies to the first rotation detector 28 and the torque detector 32.

The description that the gear motor 10 is operable when the first rotation detector 28 is disposed in the first detector disposition section 100 means that the motor 16 can be controlled by the control unit 68 using the detection signal of the first rotation detector 28. In this case, for example, the motor 16 may be driven so that a rotation speed and a rotation position of the shaft body 31, which are obtained based on the detection signal of the first rotation detector 28, satisfy a target condition. The description that the gear motor 10 is operable when the second rotation detector 30 is disposed in the second detector disposition section 102 means that the motor 16 can be controlled by the control unit 68 using the detection signal of the second rotation detector 30. In this case, for example, the motor 16 may be driven so that a rotation speed and a rotation position of the detection shaft 24 (output member 48), which are obtained based on the detection signal of the second rotation detector 30, satisfy a target condition.

The description that the gear motor 10 is operable when the torque detector 32 is disposed in the third detector disposition section 104 means that the motor 16 can be controlled by the control unit 68 using the detection signal of the torque detector 32. In this case, for example, the motor 16 may be stopped, based on the torque detected by the torque detector 32. Alternatively, the motor 16 may be driven so that the torque detected by the torque detector 32 is a target torque.

The description that the gear motor 10 is operable when any one of the torque detector 32 and the first and second rotation detectors 28 and 30 is not disposed means that motor 16 can be controlled by the control unit 68 without using the object which is not disposed (for example, the torque detector 32).

In the present embodiment, "when the first rotation detector 28 is not disposed" means when the first detection target member 28A is not disposed in the first shaft-side portion 100a of the first detector disposition section 100, and the first sensor 28B is not disposed in the first facing portion 100b. In the present embodiment, "when the second rotation detector 30 is not disposed" means when the second detection target member 30A is not disposed in the second shaft-side portion 102a of the second detector disposition section 102, and the second sensor 30B is not disposed in the second facing portion 102b. In the present embodiment, "when the torque detector 32 is not disposed" means when the torque detector 32 is not disposed in the third detector disposition section 104.

The description that the gear motor 10 is operable when the brake 34 is disposed means that the shaft body 31 can be braked by the brake 34 under control of the control unit 68. The description that the gear motor 10 is operable when the brake 34 is not disposed means that the motor 16 can be controlled by the control unit 68 without using the brake 34. Here, in the present embodiment, "when the brake 34 is not disposed" means when the brake body 82 is not disposed in the housing-side portion 106a of the brake disposition section 106, and the rotating member 78 is not disposed in the third shaft-side portion 106b.

Hitherto, an example has been described in which some combinations obtained by selecting one of the detectors 28, 30, and 32 and the brake 34 are actual omission objects. Without being limited thereto, the combination of elements which are the actual omission objects from the detectors 28, 30, and 32 and the brake 34 may be any combination obtained by selecting one or a plurality of elements from the detectors 28, 30, and 32 and the brake 34. The "plurality" here may be any number of 2, 3, and 4.

The above-described gear motor 10 is operable when the detectors 28, 30, and 32 are disposed in all of the corresponding disposition sections 100, 102, and 104, and is operable even when some of the detectors 28, 30, and 32 are disposed. Therefore, main elements of the gear motor 10 (the motor 16, the rotor shaft 18, the speed reducer 20, and the housing 22) can be shared between the gear motor 10 including all of the first and second rotation detectors 28 and 30 and the torque detector 32 and the gear motor 10 which does not include some elements thereof. That is, the main elements can be shared between a plurality of types of the gear motors 10. Therefore, it is possible to reduce manufacturing costs in handling the plurality of types of the gear motors 10. In addition, it is also possible to reduce design costs.

The gear motor 10 is operable, even when the brake 34 is disposed and when the brake 34 is not disposed. Therefore, the main elements of the gear motor 10 (motor 16, rotor shaft 18, speed reducer 20, housing 22, etc.) can be shared between the gear motor gear motor 10 provided with the brake 34 and the gear motor 10 not provided with the brake 34. Therefore, it is possible to further reduce the manufacturing costs and the design costs in handling the plurality of types of the gear motors 10.

When each of the detectors 28, 30, 32, and the brake 34 is electrically connected, the control unit 68 may be configured so that plug-and-play can be performed to automatically set a state where a connection mate thereof can be used. In this manner, even a user having no specialized knowledge can easily incorporate the detectors 28, 30, and 32 and the brake 34 into the gear motor 10.

Next, other features of the gear motor 10 will be described. With reference to FIG. 1, an embodiment will be described. The gear motor 10 includes a plurality of external bearings 110, 112, and 114 disposed in the outer peripheral portion of the shaft body 31. The plurality of external bearings 110, 112, and 114 include the first external bearing 110 disposed between the gear (external gear 50) driven by the gear drive unit 40a of the input shaft 40 and the gear drive unit 40a, a second external bearing 112 disposed on the counter load side with respect to the first external bearing 110, and a third external bearing 114 disposed on the load side with respect to the first external bearing 110.

The first external bearing 110 according to the present embodiment is a so-called vibration generating body bearing. The first external bearing 110 is a rolling bearing such as a roller bearing. Although not illustrated, the first external bearing 110 includes a plurality of rolling elements and a retainer for holding the plurality of rolling elements.

The second external bearing 112 is disposed between the inner flange portion 64 of the housing 22 and the shaft body 31. The third external bearing 114 is disposed between the fitting protrusion 46 of the carrier 44 and the shaft body 31. The second and third external bearings 112 and 114 are rolling bearings such as ball bearings.

The rotor shaft 18 and the input shaft 40 are integrally formed of the same material. The shaft body 31 including the rotor shaft 18 and the input shaft 40 is formed of a portion of a singular member. When the rotor shaft 18 and the input shaft 40 are separately formed, it is necessary to assemble the shaft body 31. In contrast, according to the present embodiment, it is not necessary to assemble the shaft body 31. Therefore, it is possible to prevent occurrence of positional variations between the rotor shaft 18 and the input shaft 40 which are caused by assembling the shaft body 31. In addition, the number of members can be reduced, compared to a case where the rotor shaft 18 and the input shaft 40 are separately formed. Therefore, it is possible to facilitate handling, reduce the manufacturing costs, and improve reliability.

Figure 3:
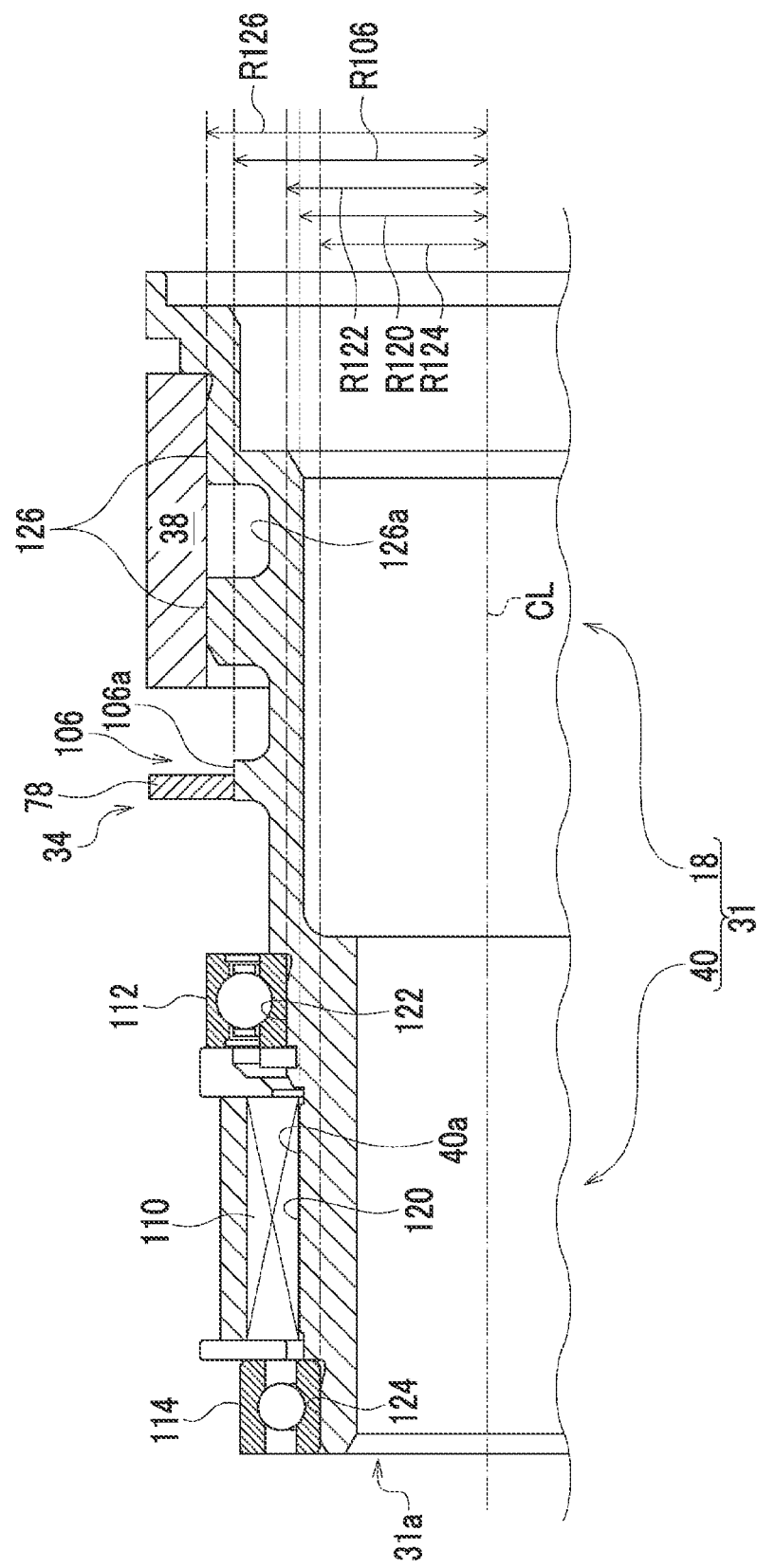
FIG. 3 is a side sectional view illustrating a portion of a shaft body according to the one embodiment together with a peripheral structure.

With reference to FIG. 3, description will be continued. In addition to a portion of the above-described brake disposition section 106 (third shaft-side portion 106b described above), the shaft body 31 includes a plurality of external bearing disposition sections 120, 122, and 124 in which the external bearings 110, 112, and 114 are disposed, and a rotor disposition section 126 in which the rotor 38 is disposed.

The rotor disposition section 126 is provided in the rotor shaft 18 of the shaft body 31. The rotor 38 is fixed to the rotor disposition section 126 by using an adhesive or fitting. The rotor disposition section 126 has a recessed thin portion 126a for weight saving of the shaft body 31.

The plurality of external bearing disposition sections 120, 122, and 124 respectively correspond to the plurality of external bearings 110, 112, and 114, and the corresponding external bearings 110, 112, and 114 are disposed. The external bearing disposition sections 120, 122, and 124 include a first external bearing disposition section 120 corresponding to the first external bearing 110, a second external bearing disposition section 122 corresponding to the second external bearing 112, and a third external bearing disposition section 124 corresponding to the third external bearing 114.

The first external bearing disposition section 120 is provided in the gear drive unit 40a of the input shaft 40. In the present embodiment, the first external bearing disposition section 120 has an elliptical shape the same as that of the gear drive unit 40a, and the second and third external bearing disposition sections 122 and 124 have a circular shape. An inner ring of the second external bearing 112 is disposed in the second external bearing disposition section 122. The inner ring of the second external bearing 112 is fixed to the second external bearing disposition section 122 by using press fitting. An outer ring of the second external bearing 112 is disposed in the inner peripheral portion of the inner flange portion 64 of the motor housing 60 (refer to FIG. 1). An inner ring of the third external bearing 114 is disposed in the third external bearing disposition section 124. The inner ring of the third external bearing 114 is fixed to the third external bearing disposition section 124 by using press fitting.

In the outer peripheral portion of the shaft body 31, the rotor disposition section 126, the third shaft-side portion 106b of the brake disposition section 106, the second external bearing disposition section 122, the first external bearing disposition section 120, and the third external bearing disposition section 124 are sequentially provided from the counter load side (right side in FIG. 3) toward the load side (left side in FIG. 3).

A maximum outer diameter of the first external bearing disposition section 120 is defined as R120, a maximum outer diameter of the second external bearing disposition section 122 is defined as R122, and a maximum outer diameter of the third external bearing disposition section 124 is defined as R124. In addition, a maximum outer diameter of the rotor disposition section 126 is defined as R126, and a maximum outer diameter of the third shaft-side portion 106b of the brake disposition section 106 is defined as R106. The maximum outer diameter here refers to a radius of a circumscribed circle circumscribed at the relevant location and concentric with the rotation center line CL of the shaft body 31.

With regard to each of the plurality of external bearing disposition sections 120, 122, and 124, the maximum outer diameters R120, R122, and R124 of the external bearing disposition sections 120, 122, and 124 are largest diameters in a range from the external bearing disposition sections 120, 122, and 124 to a load-side end portion 31a of the shaft body 31. The maximum outer diameter R120 of the first external bearing disposition section 120 is the largest in a range from the first external bearing disposition section 120 to the load-side end portion 31a. The same applies to the maximum outer diameters R122 and 124 of the other external bearing disposition sections 122 and 124. From the counter load side to the load side, the maximum outer diameters decrease in the order of the maximum outer diameter R122 of the second external bearing disposition section 122, the maximum outer diameter R120 of the first external bearing disposition section 120, and the maximum outer diameter R124 of the third external bearing disposition section 124.

In this manner, the plurality of external bearings 110, 112, and 114 are relatively moved with respect to the shaft body 31 from the load-side end portion 31a toward the counter load side of the shaft body 31. In this manner, the plurality of external bearings 110, 112, and 114 can be disposed in the outer peripheral portion of the shaft body 31. Therefore, when the plurality of external bearings 110, 112, and 114 are incorporated in the shaft body 31, relative moving directions thereof can be set in common, and satisfactory workability can be obtained.

The maximum outer diameter R126 of the rotor disposition section 126 is the largest outer diameter in a range from the rotor disposition section 126 to the load-side end portion 31a of the shaft body 31. In this manner, in addition to the plurality of external bearings 110, 112, and 114, the rotor 38 is also relatively moved from the load-side end portion 31a toward the counter load side of the shaft body 31. In this manner, the rotor 38 can be disposed in the outer peripheral portion of the shaft body 31.

The maximum outer diameter R106 of the third shaft-side portion 106b of the brake disposition section 106 is the largest outer diameter in a range from the third shaft-side portion 106b to the load-side end portion 31a of the shaft body 31. In this manner, the rotating member 78 of the brake 34 is also relatively moved from the load-side end portion 31a toward the counter load side of the shaft body 31. In this manner, the rotating member 78 of the brake 34 can be disposed in the outer peripheral portion of the shaft body 31.

With reference to FIG. 4, description will be continued. The motor housing 60 is obtained by processing a base housing 130 as an intermediate product. The base housing 130 serving as the intermediate product is an integrally molded product (casting molded product) as with the motor housing 60. As with the motor housing 60, the base housing 130 has a tubular shape as a whole, and includes the stator disposition section 62, the inner flange portion 64, and the housing-side portion 106a of the brake disposition section 106.

The base housing 130 includes a tubular length adjusting portion 132 that is continuous with a partial range from the counter load-side end portion toward the load side of the base housing 130. In the base housing 130, the length adjusting portion 132 is provided in a range in the axial direction which includes the stator disposition section 62 in which the stator 36 is to be disposed. The motor housing 60 serving as a finished product is obtained by cutting an intermediate portion in the axial direction in the length adjusting portion 132 of the base housing 130. In this case, a counter load-side portion from a cutting position in the length adjusting portion 132 of the base housing 130 is removed. A housing length of the motor housing 60 can be adjusted by adjusting the cutting position in the length adjusting portion 132 of the base housing 130. The length here means a dimension in the axial direction. After the length adjusting portion 132 of the base housing 130 is cut, it is desirable to carry out finishing work for the cut portion.

Figure 5A:
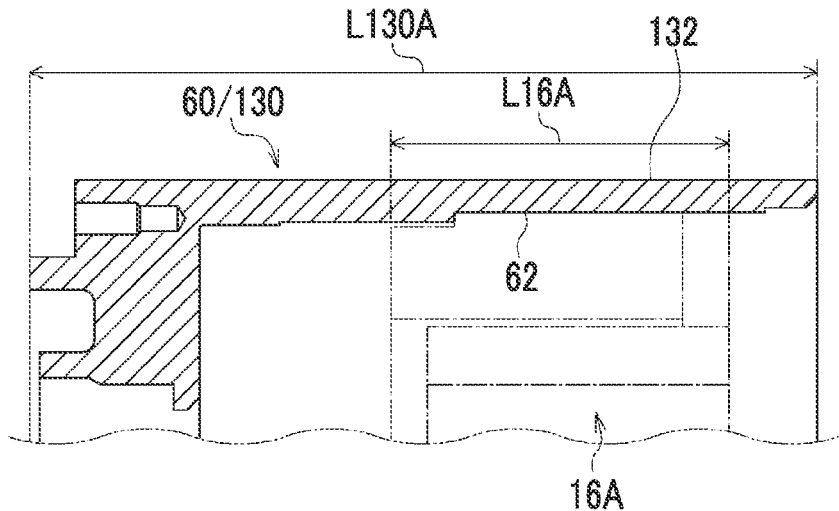
FIG. 5A illustrates a motor housing used for a first motor.
Figure 5B:
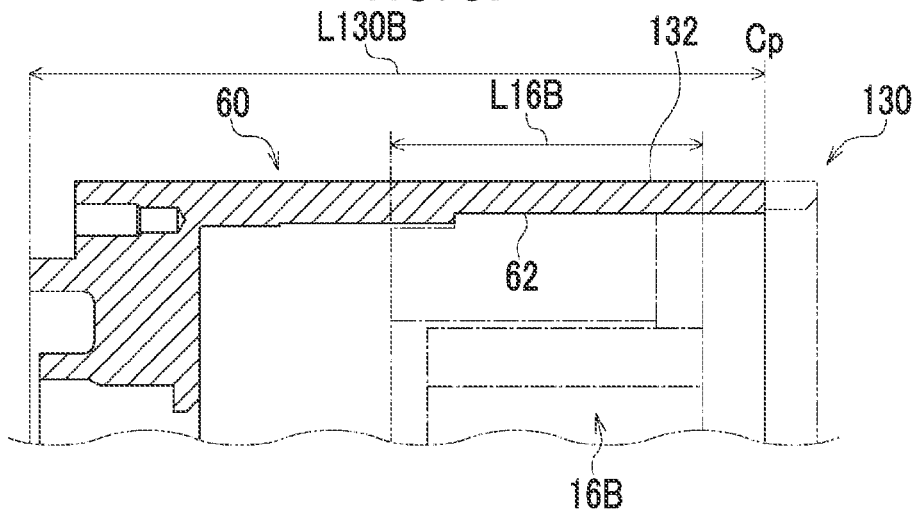
FIG. 5B illustrates a motor housing used for a second motor.
Figure 5C:
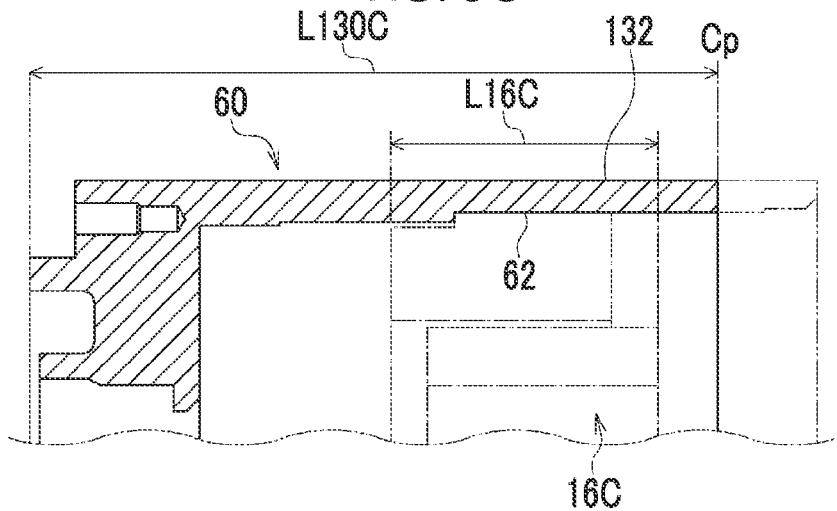
FIG. 5C illustrates a motor housing used for a third motor.

With reference to FIGS. 5A to 5C, description will be continued. The base housing 130 is shared by a plurality of types of motors 16A to 16C having different motor lengths. Here, A, B, and C are assigned to an end of the reference numerals to distinguish the plurality of types of motors from each other. For example, the plurality of types of motors 16A to 16C include a first motor 16A (refer to FIG. 5A) having a first motor length L16A which is longest. In addition, the plurality of types of motors 16A to 16C include a second motor 16B (refer to FIG. 5B) having a second motor length L16B shorter than the first motor length L16A, and a third motor 16C (refer to FIG. 5C) having a third motor length L16C shorter than the second motor length L16B.

As illustrated in FIG. 5A, the base housing 130 has a first housing length L130A corresponding to the first motor 16A having the longest length (first motor length 16A) predetermined from the plurality of types of motors 16A to 16C. When used for the motor 16A having the first motor length L16A, the base housing 130 itself forms the motor housing 60.

As illustrated in FIG. 5B, when used for the motor 16B having the second motor length L16B, the motor housing 60 is formed by cutting the length adjusting portion 132 of the base housing 130 to have the second housing length L130B corresponding to the second motor length L16B. As illustrated in FIG. 5C, when used for the motor 16C having the third motor length L16C, the motor housing 60 is formed by cutting the length adjusting portion 132 of the base housing 130 to have the third housing length L130C corresponding to the third motor length L16C. In the drawing, a cutting position Cp of the base housing 130 is illustrated.

In this way, when used for the second and third motors 16B and 16C, the motor housing 60 is formed by cutting the base housing 130 into housing lengths L130B and L130C corresponding to the motor lengths L16B and L16C of the motors 16B and 16C to be used. In this case, as the motor lengths L16B and L16C of the motors 16B and 16C to be used become shorter, the housing lengths L16B and L16C of the motor housing 60 become shorter.

In this manner, the base housing 130 for obtaining the motor housing 60 corresponding to each of the plurality of types of motors 16A to 16C can be shared. Therefore, the number of components to be managed during a manufacturing process of the gear motor 10 can be reduced, compared to a case where the motor housing 60 corresponding to each of the plurality of types of motors 16A to 16C is formed by using a dedicated integral molding product for each type of motor 16A to 16C. As a result, the manufacturing costs can be reduced.

In addition, the housing length is adjusted in accordance with the motor lengths of the motors 16A to 16C to be used. In this manner, the torque per unit weight can be efficiently increased. This advantageous effect can be realized by correspondingly shortening the housing length as the motor length becomes shorter (as the output of the motor 16 decreases).

Figure 6:
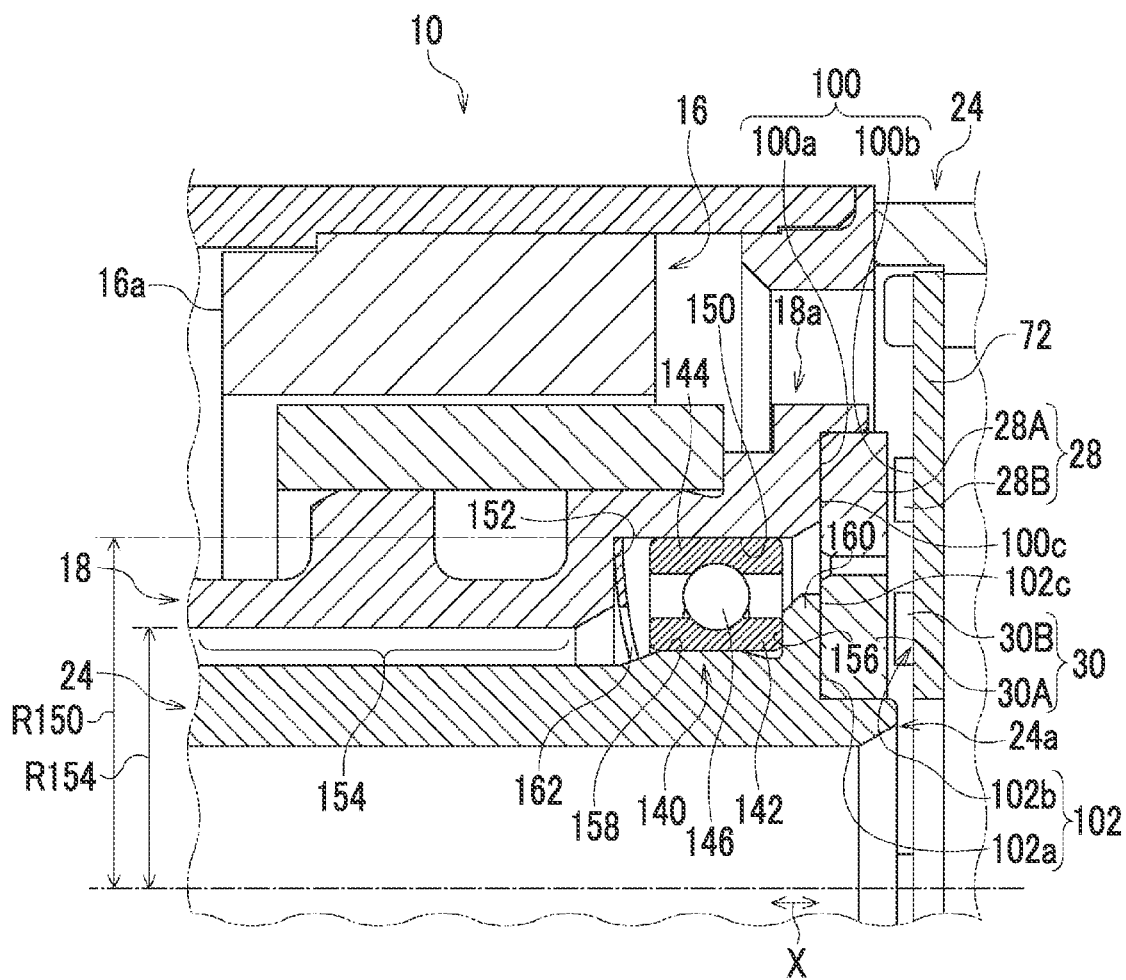
FIG. 6 is a view illustrating a peripheral structure of an internal bearing in FIG. 1.

With reference to FIG. 6, description will be continued. The gear motor 10 includes an internal bearing 140 disposed between the rotor shaft 18 and the detection shaft 24 inside the rotor shaft 18. The internal bearing 140 is a rolling bearing such as a ball bearing. The internal bearing 140 includes an inner ring 142 fixed to the detection shaft 24, an outer ring 144 fixed to the rotor shaft 18, and a rolling element 146 that rolls the inner ring 142 and the outer ring 144. A counter load-side portion of the detection shaft 24 is supported by the inner peripheral portion of the rotor shaft 18 via the internal bearing 140.

In this manner, it is possible to prevent deflection of the counter load-side end portion 24a of the detection shaft 24, and it is possible to improve detection accuracy of the second rotation detector 30. In addition, the length (dimension in the axial direction) of the detection shaft 24 can be reduced, compared to a case where the detection shaft 24 is supported by the driver unit 26 via a bearing. As a result, in addition to weight saving of the detection shaft 24, processing of the detection shaft 24 can be facilitated.

The rotor shaft 18 includes a first shaft-side portion 100a of the first detector disposition section 100, a first internal bearing disposition section 150, and a first step portion 152 which are sequentially provided from the counter load side to the load side in the inner peripheral portion of the rotor shaft 18. The first step portion 152 faces the counter load side of the rotor shaft 18.

The first shaft-side portion 100a is provided in the counter load-side end portion of the rotor shaft 18. The first detection target member 28A of the first rotation detector 28 is disposed in the first shaft-side portion 100a. The first shaft-side portion 100a is annularly continuous in the counter load-side end portion 18a of the rotor shaft 18. The first shaft-side portion 100a according to the present embodiment is formed by a recessed portion having a step shape whose inner diameter increases toward the counter load side. The first detection target member 28A is fixed to the step portion 100c facing the counter load side of the first shaft-side portion 100a by using an adhesive (not illustrated).

The outer ring 144 of the internal bearing 140 is disposed in the first internal bearing disposition section 150. The outer ring 144 is fixed to the first internal bearing disposition section 150 by fitting such as tight fitting and intermediate fitting. An inner diameter R150 of the first internal bearing disposition section 150 is larger than an inner diameter R154 of a portion 154 of the rotor shaft 18 on the load side of the rotor shaft 18 from the first internal bearing disposition section 150. For example, the portion 154 of the rotor shaft 18 here means a position overlapping a load-side end portion 16a of the motor 16 in the radial direction. In this manner, a space for disposing the internal bearing 140 can be widened, compared to a case where the inner diameter R150 of the first internal bearing disposition section 150 is aligned with the inner diameter R154 of the rotor shaft 18. As a result, the internal bearing 140 having a large size can be used to ensure durability.

The detection shaft 24 includes a second shaft-side portion 102a of the second detector disposition section 102, a second step portion 156, and a second internal bearing disposition section 158 which are sequentially provided from the counter load side to the load side in the outer peripheral portion of the detection shaft 24.

The second shaft-side portion 102a is provided in the counter load-side end portion of the detection shaft 24. The second detection target member 30A of the second rotation detector 30 is disposed in the second shaft-side portion 102a. The second shaft-side portion 102a is annularly continuous in the counter load-side end portion 24a of the detection shaft 24. The second shaft-side portion 102a according to the present embodiment is formed by a recessed portion having a step shape whose outer diameter decreases toward the counter load side. The second detection target member 30A is fixed to a step portion 102c facing the counter load side of the second shaft-side portion 102a by using an adhesive (not illustrated).

The second step portion 156 is provided in a load-side portion of a protrusion 160 provided in the outer peripheral portion of the detection shaft 24 and protruding outward in the radial direction. The second step portion 156 abuts against the inner ring 142 of the internal bearing 140 from the counter load side, thereby restricting a position of the inner ring 142 in the axial direction.

The inner ring 142 of the internal bearing 140 is disposed in the second internal bearing disposition section 158. The inner ring 142 is fixed to the second internal bearing disposition section 158 by fitting such as tight fitting and intermediate fitting.

With reference to FIGS. 1 and 6, description will be continued. The gear motor 10 includes an elastic member 162 disposed at a position pinched by the rotor shaft 18 and the internal bearing 140 in the axial direction X. The elastic member 162 according to the present embodiment is an annular leaf spring. The elastic member 162 is not particularly limited, and may be a rubber body, for example. The elastic member 162 is provided in a state of being compressed and deformed in the axial direction X by being pinched together with the internal bearing 140 by the first step portion 152 of the rotor shaft 18 and the second step portion 156 of the detection shaft 24.

The elastic member 162 pushes the outer ring 144 of the internal bearing 140 toward the detection shaft 24 side in the axial direction X by using an elastic restoring force caused by self-elastic deformation. In this manner, the elastic member 162 applies a preload in the axial direction X to the internal bearing 140 so that an axial internal clearance of the internal bearing 140 is zero or negative. This axial internal clearance is provided between each of the inner ring 142 and the outer ring 144 and the rolling element 146 when being in a state where the preload is not applied. When the axial internal clearance is positive, relative movement (rattling) of the rolling element 146 with respect to the inner ring 142 and the outer ring 144 in the axial direction X is allowed. In contrast, when the axial internal clearance is in a state of being zero or negative, the relative movement (rattling) of the rolling element 146 with respect to the inner ring 142 and the outer ring 144 in the axial direction X is restricted.

The above-described elastic member 162 can suppress the rattling of the rolling element 146, and can prevent noise caused by the rattling. In addition, since the elastic member 162 elastically deforms in the axial direction X, positions of the detection shaft 24 and the rotor shaft 18 in the axial direction X can be adjusted while maintaining a state where the preload is applied to the internal bearing 140 by the elastic member 162. That is, the elastic member 162 can allow position adjustment of the detection shaft 24 and the rotor shaft 18 in the axial direction X while preventing the noise. In order to adjust the position in this way, as described above, the detection shaft 24 may be fixed to the output member 48 while the position in the axial direction of the detection shaft 24 with respect to the output member 48 is adjusted.

In the present embodiment, the first detection target member 28A of the first rotation detector 28 is disposed in the rotor shaft 18, and the second detection target member 30A of the second rotation detector 30 is disposed in the detection shaft 24. Therefore, the positions of the first detection target member 28A and the second detection target member 30A can be aligned in the axial direction X by adjusting the positions of the detection shaft 24 and the rotor shaft 18 in the axial direction X. In this manner, the relative positions of the detection target members 28A and 30A with respect to the common sensor board 72 in the axial direction X can easily be aligned, and detection accuracy of the rotation detectors 28 and 30 can be improved.

Figure 7:
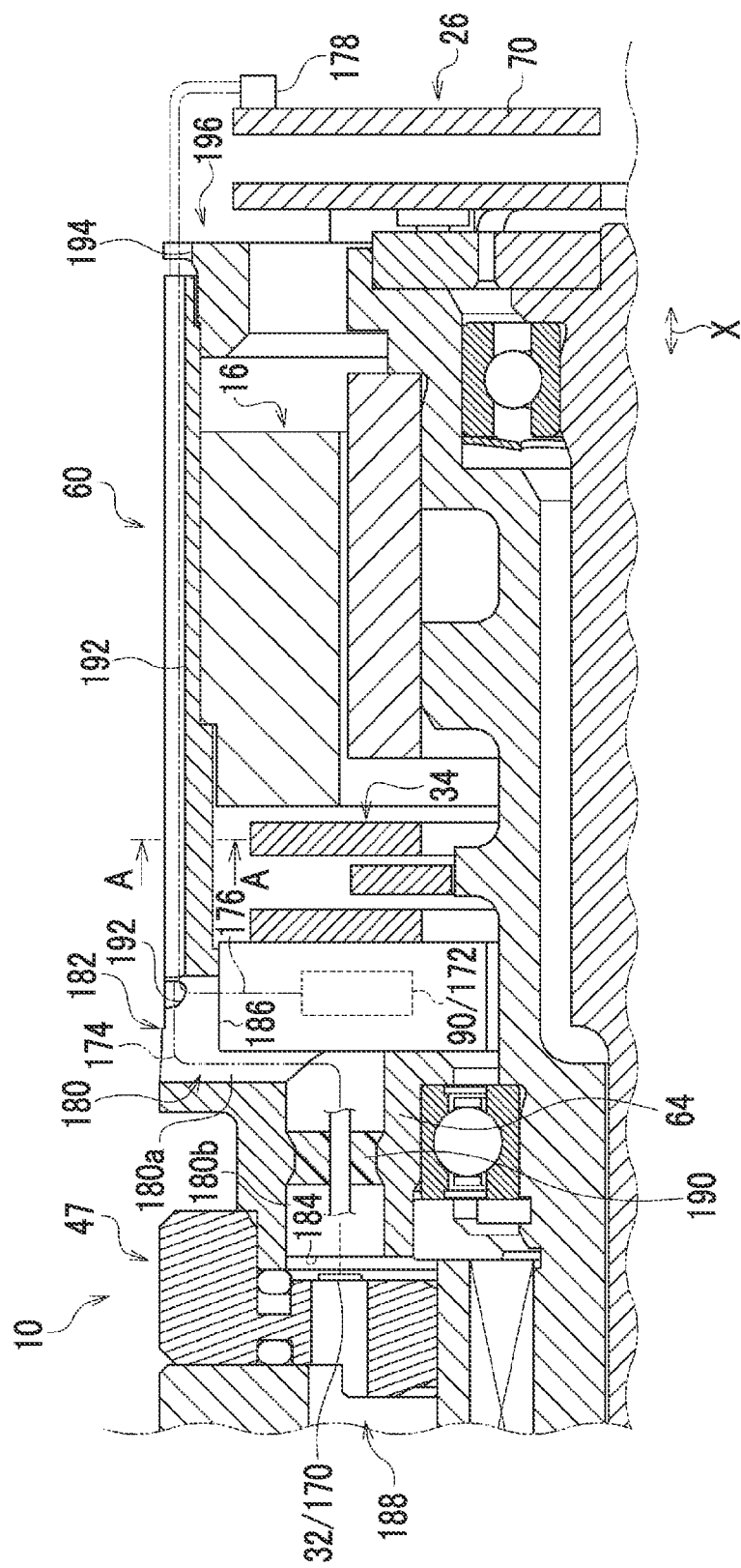
FIG. 7 is a side sectional view illustrating a wiring used for the gear motor according to the one embodiment together with a peripheral structure.

With reference to FIG. 7, description will be continued. FIG. 7 is a side sectional view when the gear motor 10 is cut at a position in the circumferential direction which is different from that in FIG. 1. The gear motor 10 includes electronic components 170 and 172 disposed on the load side with respect to the motor 16. The electronic components 170 and 172 according to the present embodiment include a first electronic component 170 which is the torque detector 32 and a second electronic component 172 which is the coil 90 serving as a forming component of the brake 34. The first electronic component 170 is disposed inside the speed reducer housing 47. The second electronic component 172 is disposed inside the motor housing 60.

The gear motor 10 includes wirings 174 and 176 that connect the electronic components 170 and 172 to the driver unit 26. FIG. 7 mainly illustrates a center line of the wirings 174 and 176. The wirings 174 and 176 include a first wiring 174 connecting the control board 70 of the driver unit 26 and the first electronic component 170 to each other, and a second wiring 176 connecting the control board 70 and the second electronic component 172 to each other. The wirings 174 and 176 are connected to the control board 70 via a connector 178 provided in the control board 70.

The housing 22 includes a drawing hole 180 for drawing the wirings 174 and 176 out from the inside of the housing 22. The drawing hole 180 includes an external opening portion 182 that is open to the outer peripheral portion of the housing 22, and internal opening portions 184 and 186 that are open to the inside of the housing 22. The internal opening portions 184 and 186 include a first internal opening portion 184 that is open to the speed reducer housing 47, and a second internal opening portion 186 that is open to the motor housing 60. The drawing hole 180 includes a radial portion 180a extending in the radial direction and an axial portion 180b extending in the axial direction. The external opening portion 182 is provided in an outer peripheral end portion of the radial portion 180a. An inner peripheral side portion of the radial portion 180a is open to the inside of the motor housing 60, and is also open to the axial portion 180b. The axial portion 180b penetrates the inner flange portion 64 of the motor housing 60 in the axial direction X. A grommet 190 for preventing a leakage of a lubricant sealed in an internal space 188 of the speed reducer 20 is disposed in the axial portion 180b.

A portion of the wirings 174 and 176 passes through the outside of the motor housing 60. Specifically, the wirings 174 and 176 are drawn out from the drawing hole 180 to the outside of the motor housing 60 on the load side with respect to the motor 16. The first wiring 174 is drawn out from the drawing hole 180 via the first internal opening portion 184 and the external opening portion 182. The first wiring 174 according to the present embodiment is inserted into the grommet 190. The second wiring 176 is drawn out from the drawing hole 180 via the second internal opening portion 186 and the external opening portion 182. The first and second wirings 174 and 176 are drawn out from the drawing hole 180 via the common external opening portion 182. The wirings 174 and 176 pass through the outside of the motor housing 60 at a position overlapping the motor 16 in the radial direction. The wirings 174 and 176 are connected to the connector 178 of the driver unit 26 on the counter load side from the motor housing 60.

Figure 8:
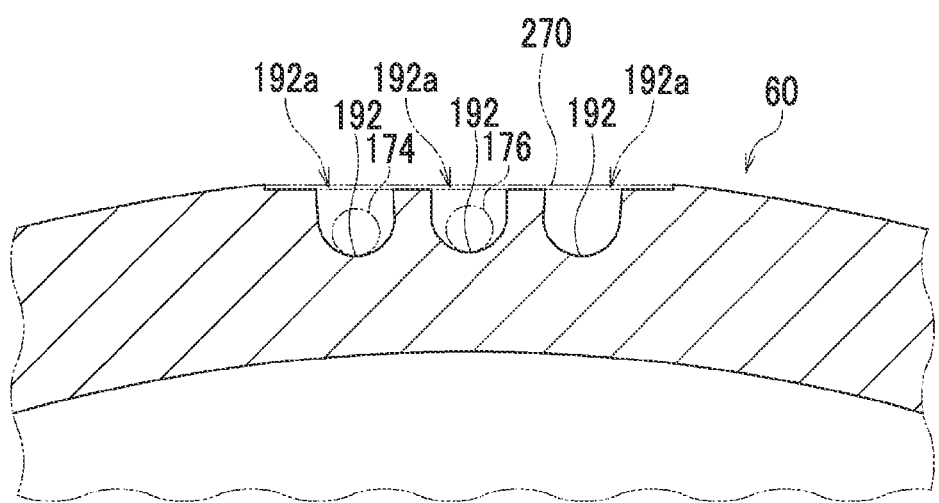
FIG. 8 is a sectional view taken along line A-A in FIG. 7.

With reference to FIGS. 7 and 8, description will be continued. The motor housing 60 includes a wiring groove 192 provided in the outer peripheral portion of the motor housing 60 and extending from the load side toward the counter load side. The wiring groove 192 is continuous from the external opening portion 182 of the drawing hole 180 to the counter load-side end portion of the motor housing 60. The wiring groove 192 according to the present embodiment includes a plurality of (three in the present embodiment) wiring grooves 192 disposed in parallel in the circumferential direction. The number of wiring grooves 192 is not particularly limited, and may be one, two, four, or more.

The wirings 174 and 176 are disposed along the wiring groove 192 outside the housing 22. In this manner, the wirings 174 and 176 can be disposed while the wirings 174 and 176 are guided by the wiring groove 192, and wiring work of the wirings 174 and 176 can easily be carried out. In addition, it is not necessary to mount a dedicated element such as a guide for carrying out the wiring work for the wirings 174 and 176 on the housing 22. Accordingly, size reduction and weight saving of the gear motor 10 can be achieved.

Each of the plurality of wirings 174 and 176 is disposed inside the individual wiring groove 192. The wirings 174 and 176 are disposed to be accommodated inside the wiring groove 192, when viewed in the axial direction X. The wirings 174 and 176 are disposed not to protrude outward in the radial direction from an inlet opening portion 192*a* provided on an inlet side of the wiring groove 192, when viewed in the axial direction X. In the present embodiment, a wiring groove 194 for internally disposing the wirings 174 and 176 is also formed in a driver mount 196 (to be described later).

The wirings 174 and 176 pass through the outside of the motor housing 60. Therefore, it is not necessary to secure an extra wiring space for disposing the wirings 174 and 176 between the motor housing 60 and the motor 16. As a result, it is possible to prevent a size increase of the motor 16 caused by securing the extra wiring space.

With reference to FIGS. 1, 9, 10, and 11, description will be continued. The board holder 74 of the driver unit 26 includes a plate-shaped base portion 74*a* disposed on the counter load side with respect to the control board 70, and first and second seat portions 74*b* and 74*c* protruding to the load side from the base portion 74*a*. The control board 70 is fixed by a screw member in a state where the first seat portion 74*b* is seated. The sensor board 72 is fixed by a screw member in a state where the second seat portion 74*c* is seated. The board holder 74 includes a peripheral wall portion 74*d* provided on an outer side in the radial direction with respect to the control board 70.

The gear motor 10 includes the driver mount 196 for mounting the driver unit 26 on the motor housing 60. The driver mount 196 has a tubular shape as a whole. The driver mount 196 includes an insertion portion 196*a* inserted into the load side from a counter load-side opening portion of the motor housing 60, an annular outer flange portion 196*b* provided on the counter load side from the insertion portion 196*a*, and a thick portion 196*c* protruding outward in the radial direction from the insertion portion 196*a*.

The outer flange portion 196*b* protrudes outward in the radial direction in the outer peripheral portion of the driver mount 196. The outer flange portion 196*b* abuts against the counter load-side end portion of the motor housing 60.

Figure 9:
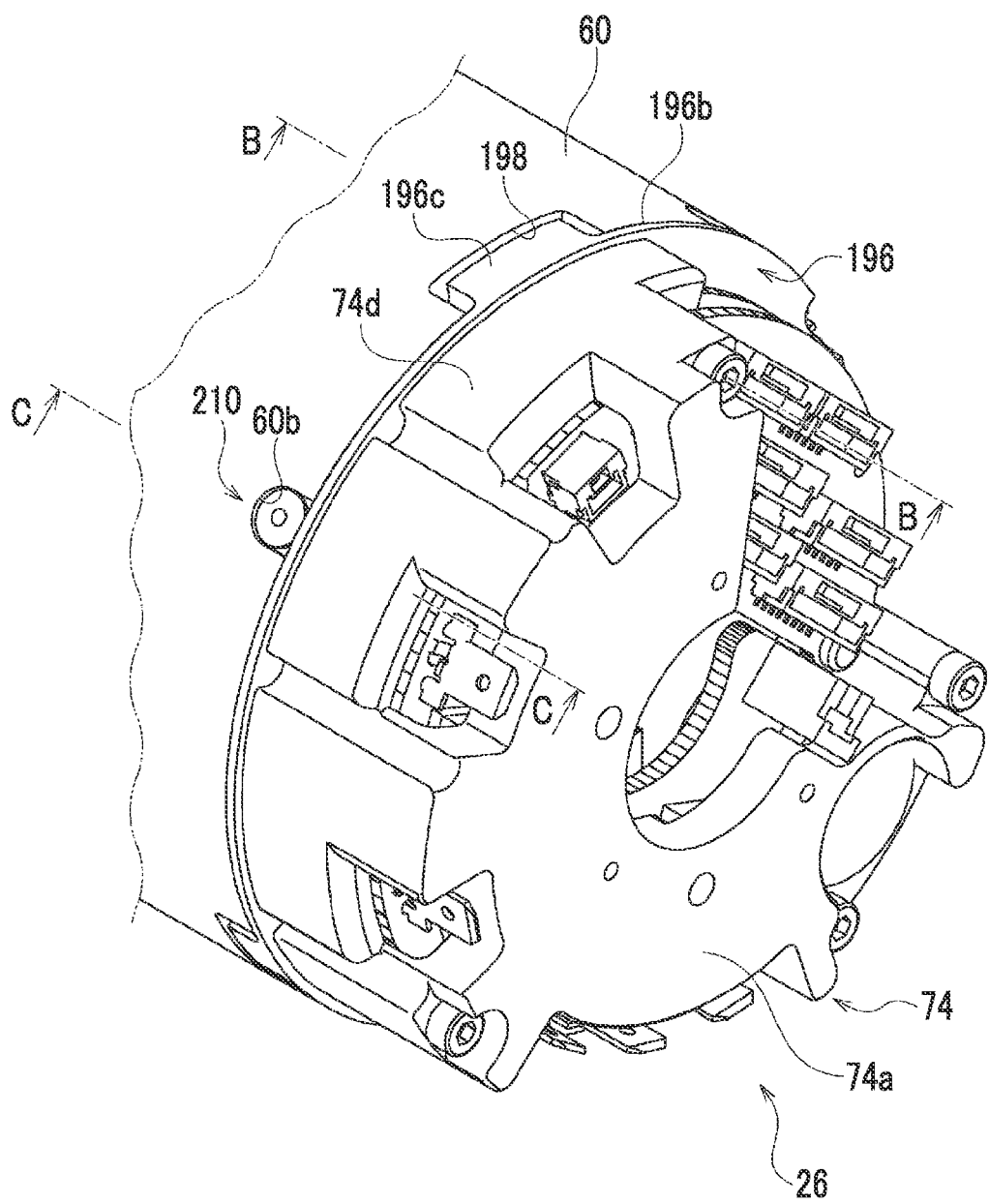
FIG. 9 is a perspective view illustrating a driver unit used for the gear motor according to the one embodiment together with a peripheral structure.
Figure 10:
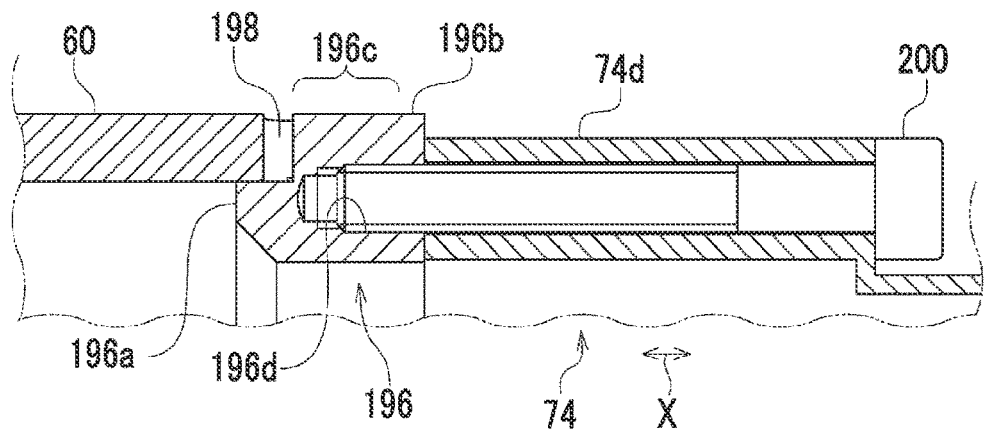
FIG. 10 is a side sectional view illustrating a portion of a cross section taken along line B-B in FIG. 9.

With reference to FIGS. 9 and 10, description will be continued. The thick portion 196*c* has a thicker radial dimension than the insertion portion 196*a*. The thick portion 196*c* protrudes outward in the radial direction from the insertion portion 196*a*, and is disposed inside a recessed portion 198 formed in the motor housing 60. The peripheral wall portion 74*d* of the board holder 74 abuts against the driver mount 196 from the counter load side, and is connected to the driver mount 196 in the axial direction X by a screw member 200 penetrating the board holder 74. The screw member 200 is screwed into a female screw hole 196*d* formed at a position overlapping the thick portion 196*c* of the driver mount 196 in the radial direction.

Figure 11:
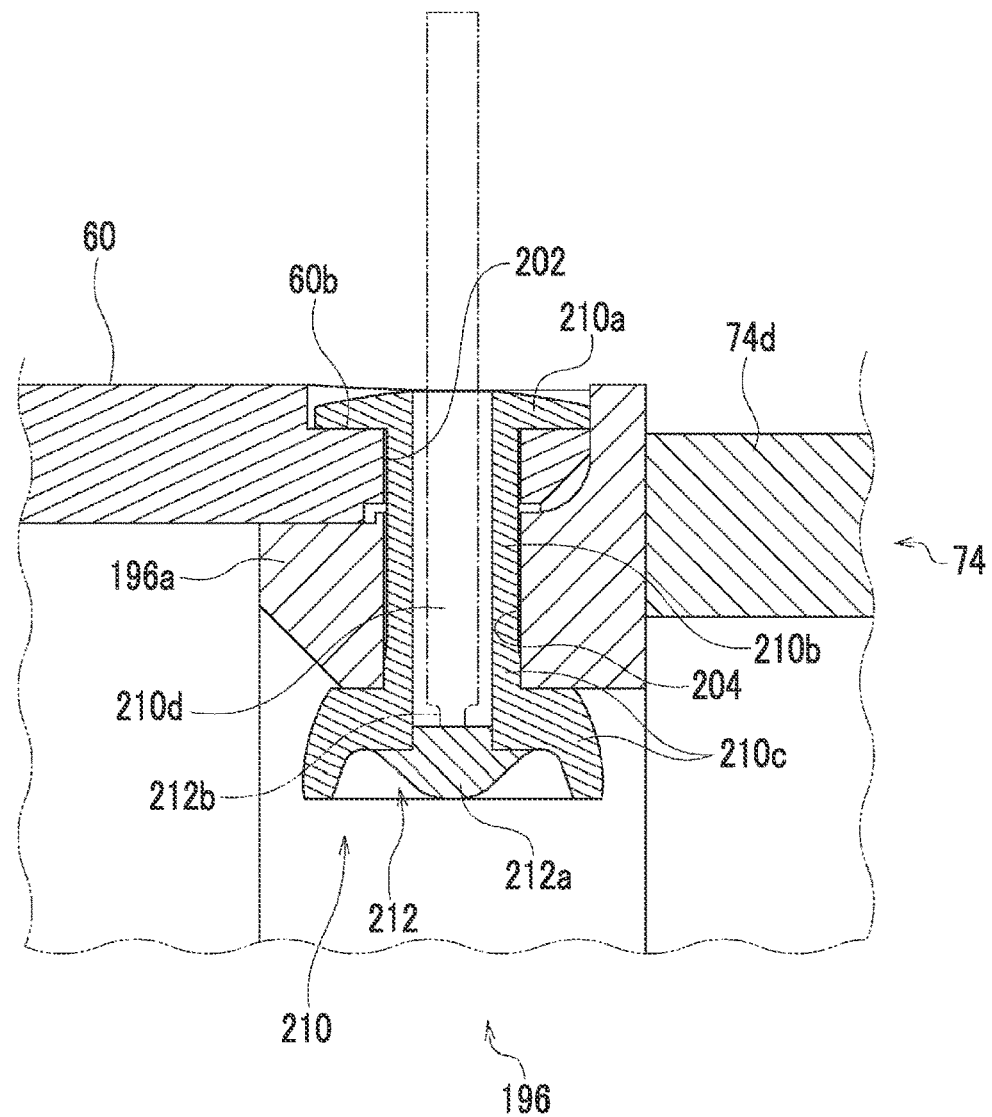
FIG. 11 is a side sectional view illustrating a portion of a cross section taken along line C-C in FIG. 9.

With reference to FIG. 11, description will be continued. The motor housing 60 includes a housing-side fixing hole 202 penetrating the motor housing 60 in the radial direction. The driver mount 196 includes a mount-side fixing hole 204 penetrating the insertion portion 196*a* of the driver mount 196 in the radial direction.

The driver mount 196 is connected to the motor housing 60 by a plurality of rivets 210. In the drawing, only a single rivet 210 is illustrated. The rivet 210 connects the motor housing 60 and the driver mount 196 in the radial direction. The rivet 210 connects the motor housing 60 and an overlapping location of the driver mount 196 in the radial direction. The plurality of rivets 210 are provided at positions apart from each other in the circumferential direction. The rivet 210 includes a head portion 210*a* disposed outside the motor housing 60, and a shaft portion 210*b* inserted into the fixing holes 202 and 204 of the motor housing 60 and of the driver mount 196.

The head portion 210*a* of the rivet 210 is accommodated inside a counterbore portion 60*b* provided in the outer peripheral portion of the motor housing 60. The rivet 210 connects the motor housing 60 and the driver mount 196 by providing a caulked portion 210*c* in a portion of the rivet 210. The portion of the rivet 210 means a tip-side portion of the shaft portion 210*b*. The caulked portion 210*c* of the rivet 210 hits the driver mount 196 to restrict drawing from the fixing holes 202 and 204. The caulked portion 210*c* of the rivet 210 is in close contact with the inner peripheral portion of the mount-side fixing hole 204, and restricts a positional deviation of the driver mount 196 with respect to the rivet 210 in the radial direction.

The rivet 210 according to the present embodiment is a blind rivet, and includes a hollow hole 210*d* penetrating the shaft portion 210*b* of the rivet 210. The caulked portion 210*c* is provided in the rivet 210 by inserting a mandrel 212 into the hollow hole 210*d* from the inside to the outside in the radial direction, and by drawing the mandrel 212 outward in the radial direction. In this case, a constricted portion 212*b* of the mandrel 212 is broken so that a head portion 212*a* of the mandrel 212 remains inside the rivet 210.

The driver mount 196 is connected to the housing 22 by the rivet 210. Therefore, compared to a case of using a screw, it is not necessary to secure a clearance between a shaft portion of the screw and the fixing holes 202 and 204. As a result, the driver mount 196 and the housing 22 can be connected to each other while the positional deviation in the radial direction is prevented. In particular, when the sensors 28B and 30B of the rotation detectors 28 and 30 are incorporated in the driver mount 196, detection accuracy of the rotation detectors 28 and 30 can be improved by preventing the positional deviation of the driver mount 196 and the housing 22 in the radial direction.

The rivet 210 connects the motor housing 60 and the driver mount 196 in the radial direction. Therefore, the thickness of the housing 22 in the radial direction can be reduced, compared to a case of being connected by the rivet 210 in the axial direction X. As a result, the outer diameter dimension of the housing 22 can be reduced. In addition, compared to a case of using a screw, it is not necessary to provide a female screw in the mount-side fixing hole 204. Accordingly, the thickness of the driver mount 196 in the radial direction can be reduced.

Figure 12:
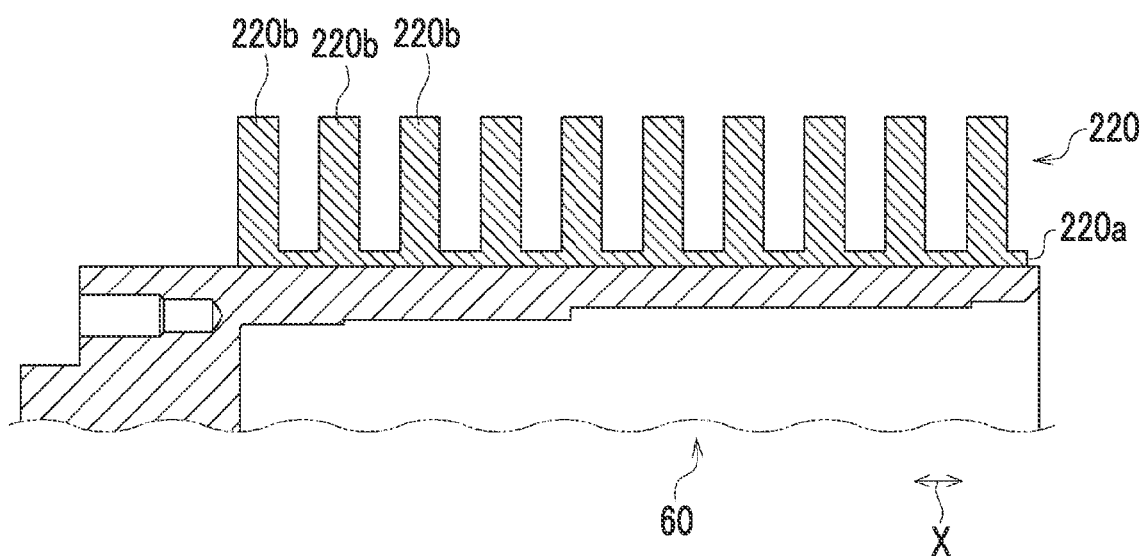
FIG. 12 is a side sectional view illustrating a radiator used for the gear motor according to the one embodiment together with a peripheral structure.

Next, another usage mode of the gear motor 10 according to the one embodiment will be described. With reference to FIG. 12, description will be continued. The gear motor 10 includes a radiator 220 for radiating heat transmitted from the motor housing 60 to the outside. Since the radiator 220 is used, cooling of the motor housing 60 can be promoted. The radiator 220 includes a peripheral wall portion 220a covering the motor housing 60, and a plurality of fin portions 220b protruding outward in the radial direction from the peripheral wall portion 220a.

For example, the peripheral wall portion 220a is fitted to the outside of the motor housing 60 to be slidable in the axial direction X and not to be separable in the radial direction with respect to the motor housing 60. In order to realize this configuration, the peripheral wall portion 220a forms an arc shape continuous in a range in the circumferential direction which is longer than a half circumference of the motor housing 60. Alternatively, in order to realize this configuration, the peripheral wall portion 220a may form an annular shape continuous in a range over the entire circumference of the motor housing 60.

A cooling mechanism for cooling the radiator 220 may be incorporated in the radiator 220. For example, the cooling mechanism is a fan for generating an air flow which hits the radiator 220. Alternatively, for example, the cooling mechanism may be a combination of a cooling medium passage such as a water jacket provided inside the radiator 220 and a pump for circulating a cooling medium such as cooling water in the cooling medium passage.

Another Embodiment

Figure 13:
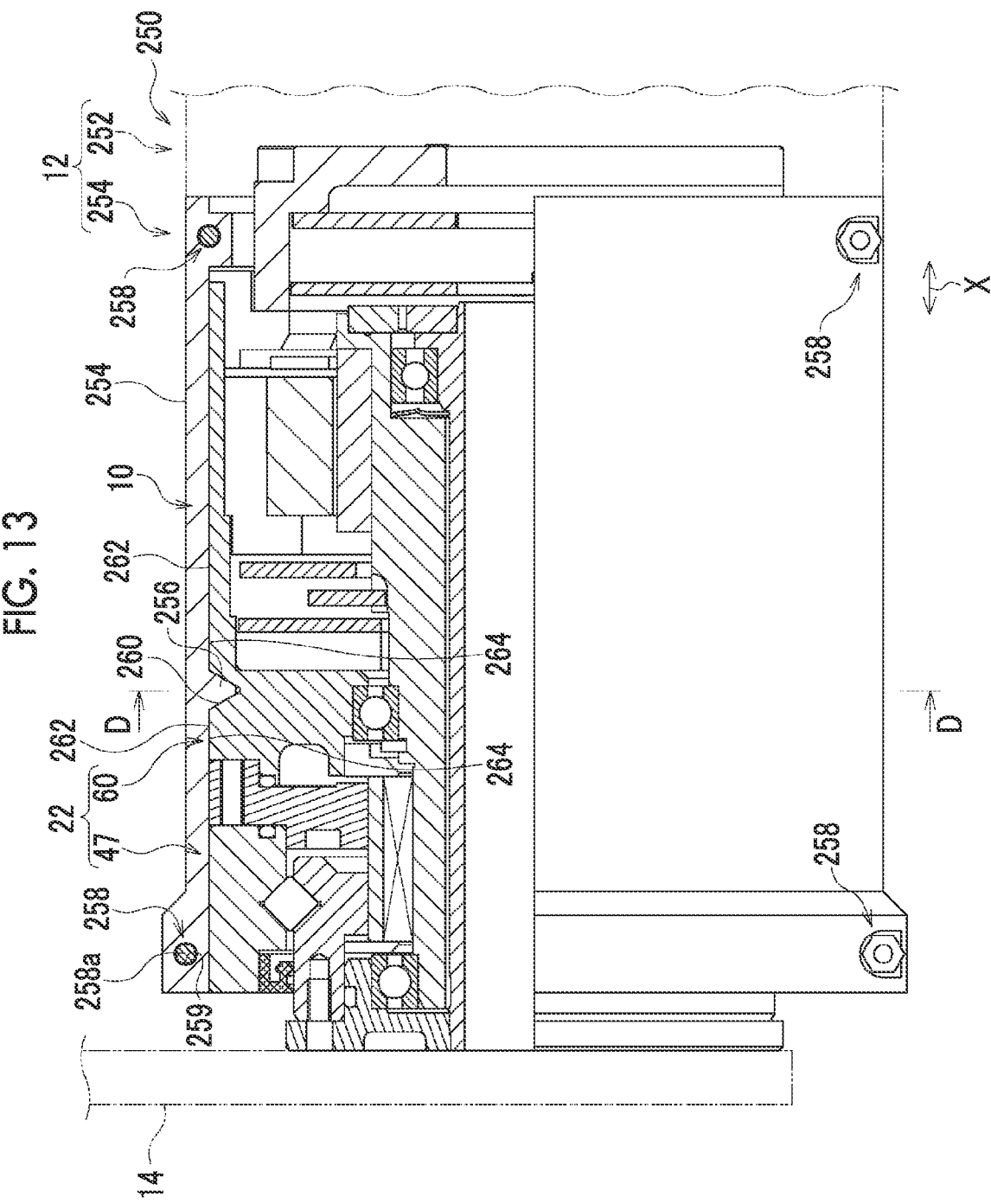
FIG. 13 is a partial side sectional view illustrating an industrial robot for which a gear motor according to another embodiment is used.
Figure 14:
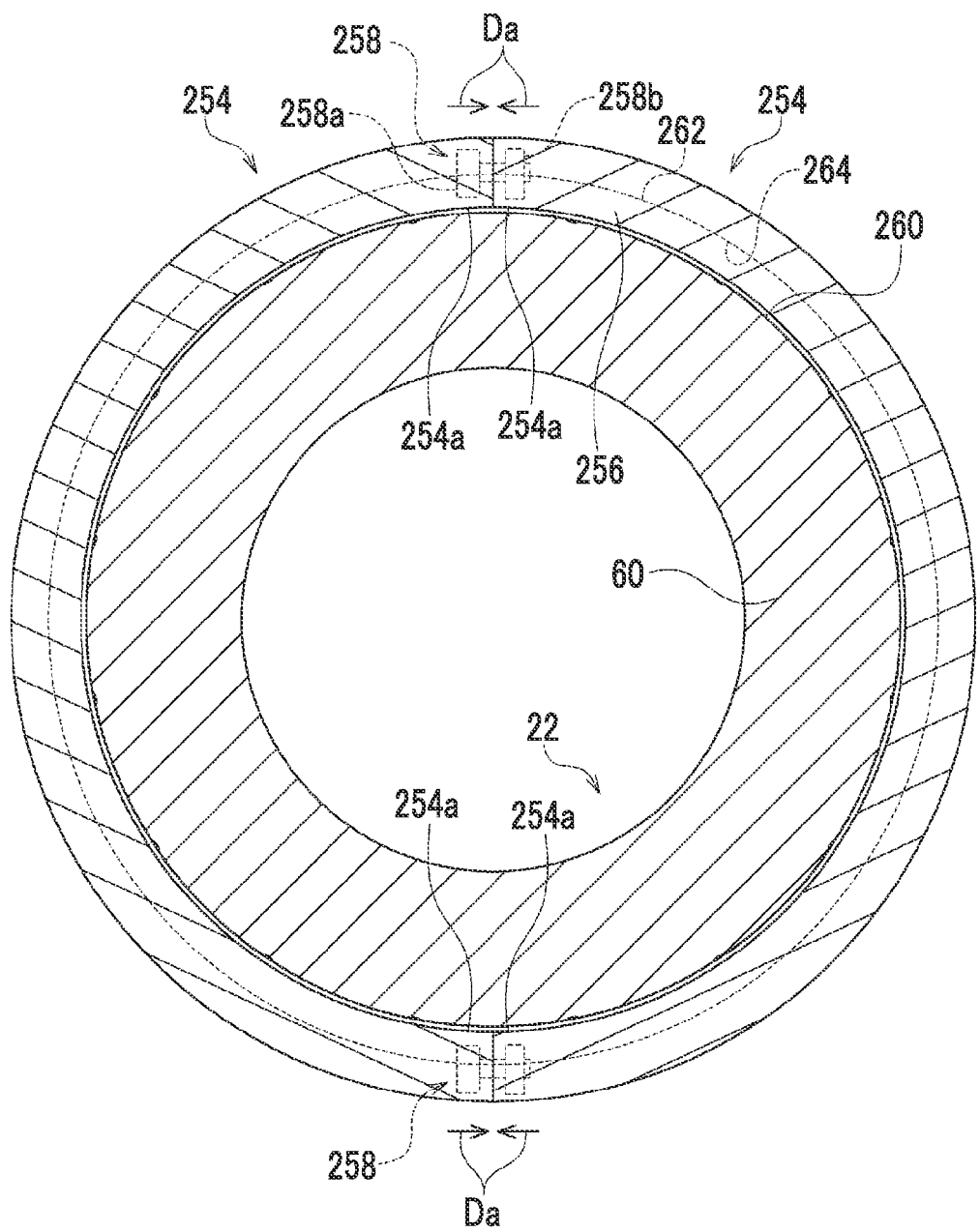
FIG. 14 is a view illustrating a portion of a cross section taken along line D-D in FIG. 13.

With reference to FIGS. 13 and 14, another embodiment of the present disclosure will be described. An industrial robot 250 for which the gear motor 10 is used includes the above-described first and second mating members 12 and 14 connected via the gear motor 10, in addition to the gear motor 10 incorporated in a joint portion of the industrial robot 250. The gear motor 10 has the same configuration as that according to the one embodiment except for the housing 22 (to be described later), and thus, description thereof will be omitted here.

The first mating member 12 includes a main body member 252 disposed on the counter load side with respect to the gear motor 10, and a plurality of (two in the present embodiment) cover members 254 fixed to the main body member 252 by using a bolt. The plurality of cover members 254 cover the whole housing 22 from the outside in the radial direction. As a whole, the plurality of cover members 254 form a tubular cross section in a cross section perpendicular to the axial direction X. Each of the plurality of cover members 254 has a cross-sectional shape in which the tubular cross section is divided into a plurality of (two in the present embodiment) pieces. The cover members 254 adjacent to each other include abutting end portions 254a provided in end portions in the circumferential direction of the individual cover member 254 and abutting against each other.

The cover member 254 includes a ridge portion 256 provided in the inner peripheral portion of the cover member 254. The ridge portion 256 protrudes inward in the radial direction in the inner peripheral portion of the cover member 254, and is continuous in the circumferential direction.

The gear motor 10 includes a fastener 258 for fastening the abutting end portions 254a of the adjacent cover members 254. The fastener 258 is individually used for each of the abutting end portions 254a on both sides of the cover member 254 in the circumferential direction. The fasteners 258 are individually provided at positions apart from each other in the axial direction X. The fastener 258 includes a bolt 258a and a nut 258b. The bolt 258a is inserted into an insertion hole 259 provided in the cover member 254. When viewed in the axial direction X, the fastener 258 applies a fastening force in a fastening direction Da in which the abutting end portions 254a of the adjacent cover members 254 are closer to each other.

The housing 22 includes a groove portion 260 provided in the outer peripheral portion of the housing 22. The groove portion 260 according to the present embodiment is provided in the outer peripheral portion of the motor housing 60. The groove portion 260 is recessed inward in the radial direction in the outer peripheral portion of the housing 22, and is continuous in an annular shape in the circumferential direction. The ridge portion 256 of the cover member 254 is disposed inside the groove portion 260.

Each of the ridge portion 256 and the groove portion 260 has a shape whose dimension in the axial direction decreases inward in the radial direction. In the present embodiment, as a shape satisfying this condition, the ridge portion 256 has a trapezoidal shape, and the groove portion 260 has a V-shape. Since the condition is satisfied, the ridge portion 256 serving as a portion of the cover member 254 can be incorporated into the groove portion 260 of the housing 22 in the fastening direction Da by fastening of the fastener 258.

In this manner, a static frictional force between the ridge portion 256 of the cover member 254 and the groove portion 260 of the housing 22 can increase. As a result, a relative rotation of the housing 22 with respect to the cover member 254 can be restrained by the static frictional force, and the housing 22 can be integrated with the first mating member 12. There is the following advantage. In order to achieve this configuration, it is not necessary to provide a bolt hole in the housing 22.

The housing 22 includes outer smooth surfaces 262 provided in the outer peripheral portion of the housing 22 and provided on both sides in the axial direction with respect to the groove portion 260. The cover member 254 includes inner smooth surfaces 264 provided in the inner peripheral portion of the cover member 254 and provided on both sides in the axial direction with respect to the ridge portion 256. The smooth surfaces 262 and 264 are surfaces which are smoothly continuous without forming irregularities in the axial direction X. The inner smooth surface 264 is in surface contact with the outer smooth surface 262.

A case is conceivable where the inner smooth surface 264 is provided at a location having the ridge portion 256 of the cover member 254, and the outer smooth surface 262 is provided at a location having the groove portion 260 of the housing 22. Compared to this case, the ridge portion 256 of the cover member 254 and the groove portion 260 of the housing 22 are brought into contact with each other. In this manner, a contact area between the cover member 254 and the housing 22 can easily increase. In this manner, heat generated inside the gear motor 10 can be transferred to the housing 22, and can effectively be radiated by the cover member 254 exposed to an external space.

Other modification forms of each of the components will be described.

An applicable form of the gear motor 10 is not particularly limited. For example, the gear motor 10 may be used not only for the industrial robot but also for an automatic transport cart such as an AGV.

A specific example of the reduction mechanism 42 is not particularly limited. For example, in addition to the bending meshing type gear mechanism, the reduction mechanism 42 may be an eccentric oscillating type gear mechanism, a planetary gear mechanism, a perpendicular axis gear mechanism, or a parallel axis gear mechanism. In a case of the bending meshing type reduction mechanism, a specific example thereof is not particularly limited. In addition to the tubular type, for example, a cup type or a silk hat type may be used.

The output member 48 of the speed reducer 20 may be the speed reducer housing 47 in addition to the carrier 44. In this case, the output member 48 outputs the rotation extracted from the reduction mechanism 42 to the first mating member 12 integrated with the speed reducer housing 47.

The driver unit 26 may be formed by only the control board 70. The driver unit 26 may be directly mounted on the motor housing 60 without using the driver mount 196. The gear motor 10 may not include the driver unit 26. In this case, the control unit 68 of the driver unit 26 may be disposed outside the gear motor 10, separately from the gear motor 10.

The sensors 28B and 30B of the rotation detectors 28 and 30 may be disposed in the motor housing 60, instead of in the driver unit 26. The facing portions 100b and 102b of the detector disposition sections 100 and 102 may be provided in the motor housing 60.

The brake 34 is not limited to the disc brake, and may be a drum brake, for example. An example in which the rotating member 78 is a portion of the brake 34 has been described. However, the rotating member 78 may be the shaft body 31 itself. In this case, the movable friction member 84 may be pressed against the outer peripheral portion of the shaft body 31 serving as the rotating member 78 so that the rotating member 78 is braked by the friction.

A position for disposing the brake 34 is not particularly limited. For example, the brake 34 may be disposed on the counter load side with respect to the motor 16.

An example in which the first detector disposition section 100 is provided in the shaft body 31 has been described. However, the present disclosure is not limited thereto. For example, the first detector disposition section 100 may be provided in the stator 36. For example, the following case is assumed. A Hall element that detects the rotation of the rotor shaft 18 by detecting a permanent magnet of the rotor 38 is the first rotation detector 28.

The gear motor 10 may not include the brake disposition section 106.

The rotor shaft 18 and the input shaft 40 may be formed separately from each other.

A portion of the brake disposition section 106 (third shaft-side portion 106b) may not be provided integrally with the rotor shaft 18. For example, the following case is assumed. The rotating member 78 braked by the brake mechanism 80 as described above is the rotor shaft 18 itself. Alternatively, a portion of the brake disposition section 106 (third shaft-side portion 106b) may be provided integrally with the input shaft 40, instead of with the rotor shaft 18.

As the motor housing 60, the motor housing 60 corresponding to each of the plurality of types of motors 16A to 16C may be formed by a dedicated integrally molded product.

The detection shaft 24 may be supported via a bearing by either the input shaft 40 or the driver unit 26, instead of by the rotor shaft 18. Alternatively, the detection shaft 24 may be cantilevered and supported only by the output member 48.

The gear motor 10 may not include the elastic member 162 for applying the preload in the axial direction to the internal bearing 140. An example has been described in which the elastic member 162 is disposed at the position pinched by the first step portion 152 of the rotor shaft 18 and the internal bearing 140 in the axial direction X. Alternatively, the elastic member 162 may be disposed at a position pinched by the second step portion 156 of the detection shaft 24 and the internal bearing 140 in the axial direction X. In other words, the elastic member 162 may be disposed at a position pinched by either the detection shaft 24 or the rotor shaft 18 and the internal bearing 140 in the axial direction X. In any case, the elastic member 162 may apply the preload in the axial direction X to the internal bearing 140.

The number of electronic components disposed on the load side with respect to the motor 16 is not particularly limited. For example, the electronic component may be only either the first electronic component 170 or the second electronic component 172. In addition, a specific example of the electronic component is not particularly limited.

The wirings 174 and 176 may pass between the motor housing 60 and the motor 16 without passing through the outside of the motor housing 60. When the wirings 174 and 176 pass through the outside of the motor housing 60, the motor housing 60 may not include the wiring groove 192.

When the outer peripheral portion of the motor housing 60 is exposed to the external space, a cover material 270 (refer to FIG. 8) covering the wirings 174 and 176 may be mounted on the motor housing 60 together with the wiring groove 192. For example, the cover material 270 is a foil tape formed of metal such as aluminum.

Alternatively, when the radiator 220 is mounted on the motor housing 60, the radiator 220 may cover the wirings 174 and 176 together with the wiring groove 192.

Alternatively, the wirings 174 and 176 may be covered together with the wiring groove 192 by the first mating member 12.

Means for connecting the driver mount 196 to the motor housing 60 is not particularly limited. For example, the connecting means may be a screw. The rivet 210 may connect the housing 22 and the driver mount 196 to each other in the axial direction. In addition, when the motor housing 60 and the driver mount 196 are connected to each other in the radial direction by the rivet 210, the head portion 210a of the rivet 210 may be disposed inside the motor housing 60 in the radial direction.

The groove portion 260 of the housing 22 according to the other embodiment may be provided in the speed reducer housing 47. The number of the cover members 254 covering the housing 22 is not particularly limited. For example, the number of the cover members 254 may be three or more.

The above-described embodiments and modification forms are merely examples. The technical ideas that are abstracted from the embodiments and the modification forms should not be construed as limited to the contents of the embodiments and the modification forms. Many design changes such as modifications, additions, and deletions of the components can be made in the contents of the embodiments and the modification forms. In the above-described embodiments, the contents enabling the design changes are emphasized by assigning the notation of the "embodiments". However, the design changes are allowed even when there is no notation in the contents. A hatched cross section in the drawing does not limit a material of a hatched object.

It should be understood that the invention is not limited to the above-described embodiment, but may be modified into various forms on the basis of the spirit of the invention. Additionally, the modifications are included in the scope of the invention.

What is claimed is:

1. A gear motor comprising:
   a motor including a rotor shaft; and
   a speed reducer including an output member,
   wherein the gear motor is operable when a first rotation detector that detects rotation of the rotor shaft, a second rotation detector that detects rotation of the output member, and a torque detector are disposed and is operable even when the first rotation detector and the second rotation detector are disposed, and the torque detector is not disposed.

2. The gear motor according to claim 1, further comprising:
   a control unit,
   wherein the control unit is configured to control the gear motor based on a detection signal from the detector that is disposed among the first rotation detector, the second rotation detector, and the torque detector.

3. The gear motor according to claim 1, further comprising:
   a motor housing that accommodates the motor;
   an electronic component disposed on a load side with respect to the motor;
   a driver unit disposed on a counter load side with respect to the motor and having a control unit; and
   a wiring for connecting the electronic component and the driver unit,
   wherein the wiring passes through an outside of the motor housing.

4. The gear motor according to claim 3,
   wherein the motor housing includes a wiring groove provided in an outer peripheral portion of the motor housing and directed from the load side to the counter load side, and
   the wiring is drawn out of the motor housing on the load side with respect to the motor, and is disposed along the wiring groove.

5. The gear motor according to claim 1, further comprising:
   a motor housing that accommodates the motor;
   a driver unit disposed on a counter load side with respect to the motor and having a control unit; and
   a driver mount for mounting the driver unit on the motor housing,
   wherein the driver mount is connected to the motor housing by a rivet.

6. The gear motor according to claim 5,
   wherein the rivet connects the motor housing and the driver mount in a radial direction.

7. A gear motor comprising:
   a motor including a rotor shaft; and
   a speed reducer including an output member,
   wherein the gear motor is operable when a first rotation detector that detects rotation of the rotor shaft, a second rotation detector that detects rotation of the output member, and a torque detector are disposed and is operable even when the first rotation detector and the torque detector are disposed, and the second rotation detector is not disposed.

8. The gear motor according to claim 7, further comprising:
   a control unit,
   wherein the control unit is configured to control the gear motor based on a detection signal from the detector that is disposed among the first rotation detector, the second rotation detector, and the torque detector.

9. The gear motor according to claim 7, further comprising:
   a detection shaft penetrating an input shaft of the speed reducer and the rotor shaft, and rotating integrally with the output member of the speed reducer,
   wherein when the second rotation detector is disposed, the second rotation detector is disposed in a counter load-side end portion of the detection shaft, and when the second rotation detector is not disposed, the detection shaft is not disposed.

10. The gear motor according to claim 9,
    wherein the detection shaft is supported by an inner peripheral portion of the rotor shaft via an internal bearing.

11. The gear motor according to claim 10, further comprising:
    an elastic member disposed at a position in an axial direction between the internal bearing and any one of the detection shaft and the rotor shaft to apply a preload in the axial direction to the internal bearing.

12. The gear motor according to claim 7, further comprising:
    a motor housing that accommodates the motor;
    an electronic component disposed on a load side with respect to the motor;
    a driver unit disposed on a counter load side with respect to the motor and having a control unit; and
    a wiring for connecting the electronic component and the driver unit,
    wherein the wiring passes through an outside of the motor housing.

13. The gear motor according to claim 12,
    wherein the motor housing includes a wiring groove provided in an outer peripheral portion of the motor housing and directed from the load side to the counter load side, and
    the wiring is drawn out of the motor housing on the load side with respect to the motor, and is disposed along the wiring groove.

14. The gear motor according to claim 7, further comprising:
    a motor housing that accommodates the motor;
    a driver unit disposed on a counter load side with respect to the motor and having a control unit; and
    a driver mount for mounting the driver unit on the motor housing,
    wherein the driver mount is connected to the motor housing by a rivet.

15. The gear motor according to claim 14,
    wherein the rivet connects the motor housing and the driver mount in a radial direction.

* * * * *